United States Patent
Chauret et al.

(10) Patent No.: US 12,503,470 B2
(45) Date of Patent: Dec. 23, 2025

(54) PREPARATION OF A P2X3 ANTAGONIST

(71) Applicant: GlaxoSmithKline Intellectual Property (No.3) Limited, Stevenage (GB)

(72) Inventors: Nathalie Chauret, Laval (CA); Jeremy Green, Waltham, MA (US); David R. Kronenthal, Yardley, PA (US); Karine Villeneuve, Laval (CA)

(73) Assignee: GlaxoSmithKline Intellectual Property (No.3) Limited, Stevenage (GB)

( * ) Notice: Subject to any disclaimer, the term of this patent is extended or adjusted under 35 U.S.C. 154(b) by 626 days.

(21) Appl. No.: 17/929,027

(22) PCT Filed: Feb. 12, 2021

(86) PCT No.: PCT/IB2021/000130
§ 371 (c)(1),
(2) Date: Aug. 10, 2022

(87) PCT Pub. No.: WO2021/161109
PCT Pub. Date: Aug. 19, 2021

(65) Prior Publication Data
US 2023/0101612 A1 Mar. 30, 2023

Related U.S. Application Data

(60) Provisional application No. 63/144,902, filed on Feb. 2, 2021, provisional application No. 62/977,004, filed on Feb. 14, 2020.

(51) Int. Cl.
*C07D 471/04* (2006.01)
*C07D 265/30* (2006.01)
*C07F 9/40* (2006.01)

(52) U.S. Cl.
CPC ......... *C07D 471/04* (2013.01); *C07D 265/30* (2013.01); *C07F 9/4006* (2013.01)

(58) Field of Classification Search
CPC .................................................. C07D 471/04
See application file for complete search history.

(56) References Cited

U.S. PATENT DOCUMENTS

| | | | |
|---|---|---|---|
| 9,598,409 B2 | 3/2017 | Buon et al. | |
| 2012/0064181 A1 | 3/2012 | Burgey et al. | |
| 2023/0068538 A1 | 3/2023 | Lou et al. | |
| 2023/0312557 A1* | 10/2023 | Chauret | C07D 471/04 |
| | | | 514/217.05 |

FOREIGN PATENT DOCUMENTS

| | | | |
|---|---|---|---|
| CN | 102358739 A | 2/2012 | |
| EP | 4169921 A1 | 4/2023 | |
| WO | 2014117274 A1 | 8/2014 | |
| WO | 2019064079 A2 | 4/2019 | |
| WO | 2020135771 A1 | 7/2020 | |
| WO | WO-2021161105 A1 * | 8/2021 | ......... A61K 31/5377 |
| WO | 2021244634 A1 | 12/2021 | |
| WO | 2022001820 A1 | 1/2022 | |
| WO | 2022156783 A1 | 7/2022 | |
| WO | 2022156784 A1 | 7/2022 | |

OTHER PUBLICATIONS

American Chemical Society. Chemical Abstract Service. RN 2445364-88-3. Entered into STN: Jul. 10, 2020. (Year: 2020).*
American Chemical Society. Chemical Abstract Service. RN 2445365-75-1. Entered into STN: Jul. 10, 2020. (Year: 2020).*
American Chemical Society. Chemical Abstract Service. RN 2694061-07-7. Entered into STN: Sep. 13, 2021. (Year: 2021).*
American Chemical Society. Chemical Abstract Service. RN: 2694061-06-6. Entered into STN: Sep. 13, 2021. (Year: 2021).*
American Chemical Society. Chemical Abstract Service. RN 2694028-80-1. Entered into STN: Sep. 13, 2021. (Year: 2021).*
American Chemical Society. Chemical Abstract Service. RN 2694061-04-4. Entered into STN: Sep. 13, 2021. (Year: 2021).*
American Chemical Society. Chemical Abstract Service. RN 2766512-40-5. Entered into STN: Apr. 27, 2022. (Year: 2022).*
American Chemical Society. Chemical Abstract Service. RN 2694028-35-6. Entered into STN: Sep. 13, 2021. (Year: 2021).*
American Chemical Society. Chemical Abstract Service. RN 2694061-09-9. Entered into STN: Sep. 13, 2021. (Year: 2021).*
American Chemical Society. Chemical Abstract Service. RN 2694061-12-4. Entered into STN: Sep. 13, 2021. (Year: 2021).*
International Search Report and Written Opinion for International Application No. PCT/IB2021/000130, mailed Jun. 14, 2021, 10 Pages.
Lei J., et al., "Efficiently Microwave-assisted Synthesis of Imidazo[1,2-a]Pyridine Derivatives," Chemical Research and Application, Jun. 2018, vol. 30(6), pp. 954-957 (5 Pages).

* cited by examiner

*Primary Examiner* — John S Kenyon
(74) *Attorney, Agent, or Firm* — William B. Stauffer

(57) ABSTRACT

Described herein are two processes for the preparation of methyl (5)-2-((2-(2,6-difLuoro-4-(methylcarbamol)phenyl)-7-methylimidaz[1,2-a]pyridine-3-yl)methyl)morpholine-4-carboxylate, a P2X3 antagonist, in a stepwise manner and chemical intermediates used in the synthetic processes.

17 Claims, No Drawings

PREPARATION OF A P2X3 ANTAGONIST

CROSS-REFERENCE

This application claims the benefit of U.S. Provisional Application No. 62/977,004, filed on Feb. 14, 2020; and U.S. Provisional Application No. 63/144,902, filed on Feb. 2, 2021, both of which are herein incorporated by reference in their entirety.

BACKGROUND OF THE INVENTION

P2X purinoreceptors are a family of ion channels that are activated by extracellular adenosine triphosphate (ATP). Purinoreceptors have been implicated in a variety of biological functions. The P2X3 receptor subunit is a member of this family. It was originally cloned from rat dorsal root ganglia. Chen et al., *Nature*, vol. 377, pp. 428-431 (1995). The nucleotide and amino acid sequences of both rat and human P2X3 are now known. Lewis, et al., *Nature*, vol. 377, pp. 432-435 (1995); and Garcia-Guzman, et al., *Brain Res. Mol. Brain Res.*, vol. 47, pp. 59-66 (1997).

SUMMARY OF THE INVENTION

Described herein are processes for the synthesis of P2X3 antagonists, wherein the P2X3 antagonist is methyl (S)-2-((2-(2,6-difluoro-4-(methylcarbamoyl)phenyl)-7-methylimidazo[1,2-a]pyridin-3-yl)methyl)morpholine-4-carboxylate (Compound 1), or a pharmaceutically acceptable salt thereof.

In one aspect is a process for the preparation of methyl (S)-2-((2-(2,6-difluoro-4-(methylcarbamoyl)phenyl)-7-methylimidazo[1,2-a]pyridin-3-yl)methyl)morpholine-4-carboxylate (Compound 1):

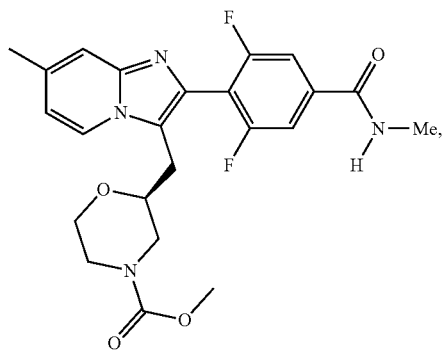

(Compound 1)

comprising contacting a compound with the structure:

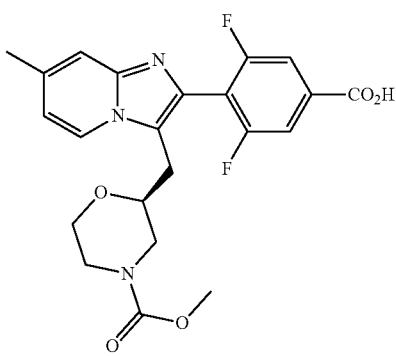 [SMILES: COC(=O)N1CCO[C@@H](Cc2c(-c3c(F)cc(C(=O)O)cc3F)nc3cc(C)ccn23)C1]

with an amide coupling reagent and methylamine, or a salt thereof. In some embodiments, the amide coupling reagent is carbonyldiimidazole. In some embodiments, the amide coupling reagent is propanephosphonic acid anhydride (T3P).

In some embodiments of a process for the preparation of methyl (S)-2-((2-(2,6-difluoro-4-(methylcarbamoyl)phenyl)-7-methylimidazo[1,2-a]pyridin-3-yl)methyl)morpholine-4-carboxylate (Compound 1), the compound with the structure:

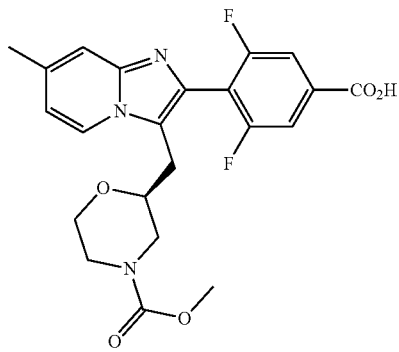 [SMILES: COC(=O)N1CCO[C@@H](Cc2c(-c3c(F)cc(C(=O)O)cc3F)nc3cc(C)ccn23)C1]

is prepared by a process comprising contacting a compound with the structure:

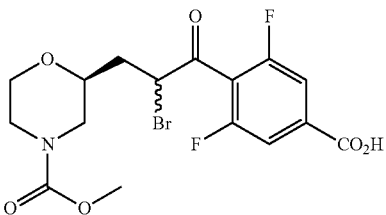 [SMILES: COC(=O)N1CCO[C@@H](CC(Br)C(=O)c2c(F)cc(C(=O)O)cc2F)C1]

with 2-amino-4-methylpyridine and optionally sodium borohydride in the presence of a solvent.

In some embodiments of a process for the preparation of methyl (S)-2-((2-(2,6-difluoro-4-(methylcarbamoyl)phenyl)-7-methylimidazo[1,2-a]pyridin-3-yl)methyl)morpholine-4-carboxylate (Compound 1), the compound with the structure:

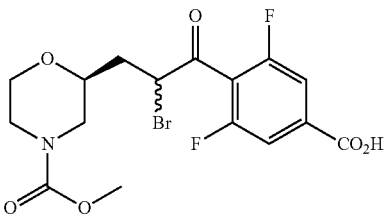 [SMILES: COC(=O)N1CCO[C@@H](CC(Br)C(=O)c2c(F)cc(C(=O)O)cc2F)C1]

is prepared by a process comprising contacting a compound with the structure:

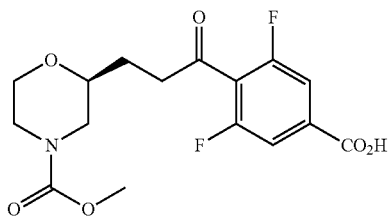 [SMILES: COC(=O)N1CCO[C@@H](CCC(=O)c2c(F)cc(C(=O)O)cc2F)C1]

with a brominating reagent. In some embodiments, the brominating agent is N-bromosuccinimide in the presence of an acid.

In some embodiments of a process for the preparation of methyl (S)-2-((2-(2,6-difluoro-4-(methylcarbamoyl)phenyl)-7-methylimidazo[1,2-a]pyridin-3-yl)methyl)morpholine-4-carboxylate (Compound 1), the compound with the structure:

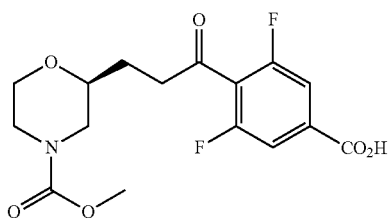 [SMILES: COC(=O)N1CCO[C@@H](CCC(=O)c2c(F)cc(C(=O)O)cc2F)C1]

is prepared by a process comprising contacting a compound with the structure:

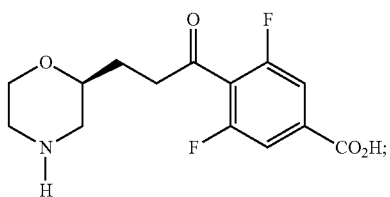 [SMILES: O=C(O)c1cc(F)c(C(=O)CC[C@H]2CNCCO2)c(F)c1]

with methyl chloroformate and a base. In some embodiments, the base is sodium bicarbonate In some embodiments of a process for the preparation of methyl (S)-2-((2-(2,6-difluoro-4-(methylcarbamoyl)phenyl)-7-methylimidazo[1,2-a]pyridin-3-yl)methyl)morpholine-4-carboxylate (Compound 1), the compound with the structure:

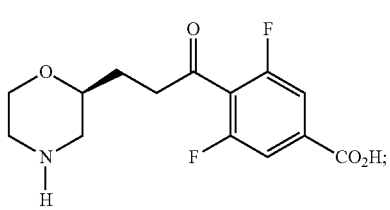 [SMILES: O=C(O)c1cc(F)c(C(=O)CC[C@H]2CNCCO2)c(F)c1]

is prepared by a process comprising contacting a compound with the structure:

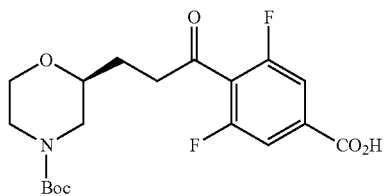 [SMILES: CC(C)(C)OC(=O)N1CCO[C@@H](CCC(=O)c2c(F)cc(C(=O)O)cc2F)C1]

with hydrogen chloride in the presence of a solvent. In some embodiments, the solvent is ethyl acetate.

In some embodiments of a process for the preparation of methyl (S)-2-((2-(2,6-difluoro-4-(methylcarbamoyl)phenyl)-7-methylimidazo[1,2-a]pyridin-3-yl)methyl)morpholine-4-carboxylate (Compound 1), the compound with the structure:

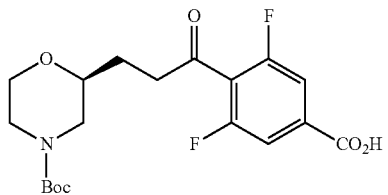 [SMILES: CC(C)(C)OC(=O)N1CCO[C@@H](CCC(=O)c2c(F)cc(C(=O)O)cc2F)C1]

is prepared by a process comprising contacting a compound with the structure:

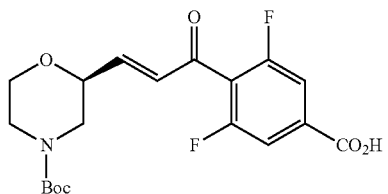 [SMILES: CC(C)(C)OC(=O)N1CCO[C@@H](/C=C/C(=O)c2c(F)cc(C(=O)O)cc2F)C1]

with a hydrogenation catalyst and hydrogen. In some embodiments, the hydrogenation catalyst is palladium on carbon, palladium hydroxide, rhodium on carbon, rhodium on alumina, platinum oxide, or platinum on carbon. In some embodiments, the hydrogenation catalyst is palladium on carbon.

In some embodiments of a process for the preparation of methyl (S)-2-((2-(2,6-difluoro-4-(methylcarbamoyl)phenyl)-7-methylimidazo[1,2-a]pyridin-3-yl)methyl)morpholine-4-carboxylate (Compound 1), the compound with the structure:

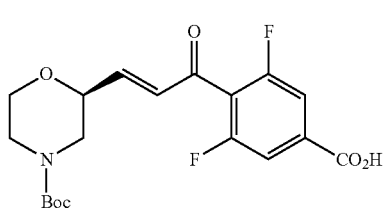 [SMILES: CC(C)(C)OC(=O)N1CCO[C@@H](/C=C/C(=O)c2c(F)cc(C(=O)O)cc2F)C1]

is prepared by a process comprising contacting a compound with the structure:

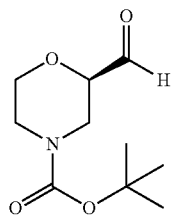

and a compound with the structure:

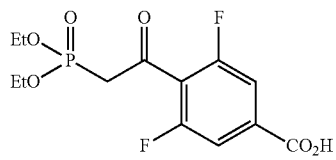

with a base. In some embodiments, the base is a mixture of potassium bicarbonate and potassium carbonate In some embodiments of a process for the preparation of methyl (S)-2-((2-(2,6-difluoro-4-(methylcarbamoyl)phenyl)-7-methylimidazo[1,2-a]pyridin-3-yl)methyl)morpholine-4-carboxylate (Compound 1), the compound with the structure:

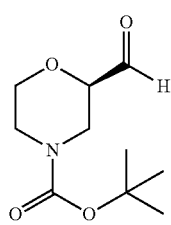

is prepared by a process comprising contacting a compound with the structure:

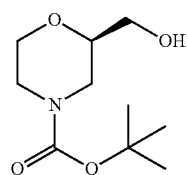

with 2,2,6,6-tetramethylpiperidine 1-oxyl or propanephosphonic acid anhydride (T3P). In another aspect is a process for the preparation of methyl (S)-2-((2-(2,6-difluoro-4-(methylcarbamoyl)phenyl)-7-methylimidazo[1,2-a]pyridin-3-yl)methyl)morpholine-4-carboxylate (Compound 1):

(Compound 1)

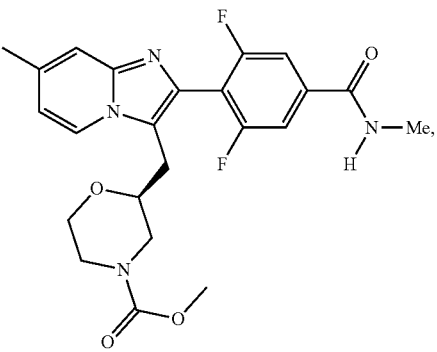

comprising contacting a compound with the structure:

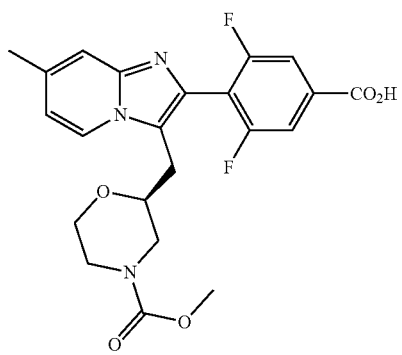 [SMILES: COC(=O)N1CCO[C@@H](Cc2c(-c3c(F)cc(C(=O)O)cc3F)nc3cc(C)ccn23)C1]

with an amide coupling reagent and methylamine, or a salt thereof. In some embodiments, the amide coupling reagent is carbonyldiimidazole. In some embodiments, the amide coupling reagent is propanephosphonic acid anhydride (T3P).

In some embodiments of a process for the preparation of methyl (S)-2-((2-(2,6-difluoro-4-(methylcarbamoyl)phenyl)-7-methylimidazo[1,2-a]pyridin-3-yl)methyl)morpholine-4-carboxylate (Compound 1), the compound with the structure:

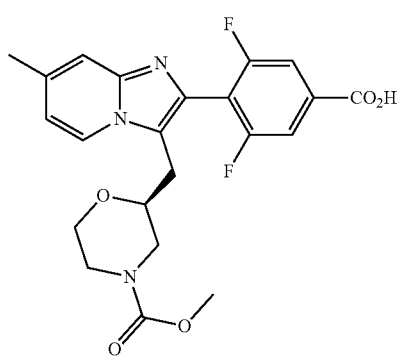 [SMILES: COC(=O)N1CCO[C@@H](Cc2c(-c3c(F)cc(C(=O)O)cc3F)nc3cc(C)ccn23)C1]

is prepared by a process comprising contacting a compound with the structure:

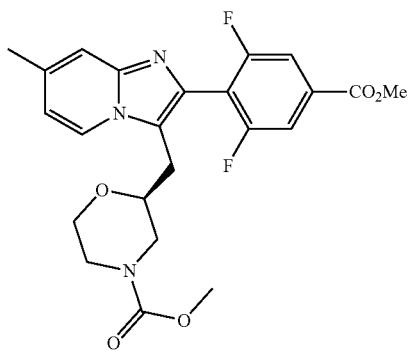 [SMILES: COC(=O)c1cc(F)c(-c2nc3cc(C)ccn3c2C[C@H]2CN(C(=O)OC)CCO2)c(F)c1]

with base and optionally sodium borohydride in the presence of a solvent. In some embodiments, the solvent is aqueous tetrahydrofuran, dioxane, 2-methyl tetrahydrofuran, aqueous methanol, aqueous ethanol, or aqueous acetonitrile. In some embodiments, the solvent is aqueous tetrahydrofuran. In some embodiments, the base is lithium hydroxide.

In some embodiments of a process for the preparation of methyl (S)-2-((2-(2,6-difluoro-4-(methylcarbamoyl)phenyl)-7-methylimidazo[1,2-a]pyridin-3-yl)methyl)morpholine-4-carboxylate (Compound 1), the compound with the structure:

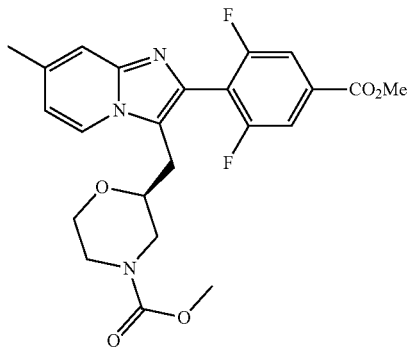 [SMILES: COC(=O)c1cc(F)c(-c2nc3cc(C)ccn3c2C[C@H]2CN(C(=O)OC)CCO2)c(F)c1]

is prepared by a process comprising contacting a compound with the structure:

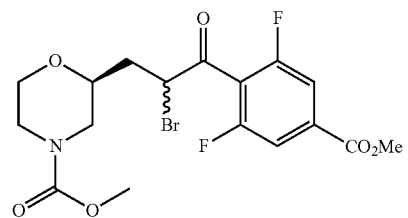 [SMILES: COC(=O)c1cc(F)c(C(=O)C(Br)C[C@H]2CN(C(=O)OC)CCO2)c(F)c1]

with 2-amino-4-methylpyridine.

In some embodiments of a process for the preparation of methyl (S)-2-((2-(2,6-difluoro-4-(methylcarbamoyl)phenyl)-7-methylimidazo[1,2-a]pyridin-3-yl)methyl)morpholine-4-carboxylate (Compound 1), the compound with the structure:

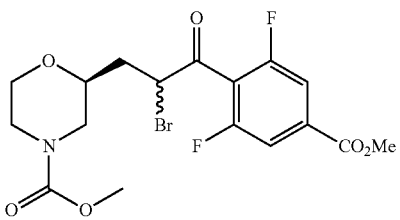 [SMILES: COC(=O)c1cc(F)c(C(=O)C(Br)C[C@H]2CN(C(=O)OC)CCO2)c(F)c1]

is prepared by a process comprising contacting a compound with the structure:

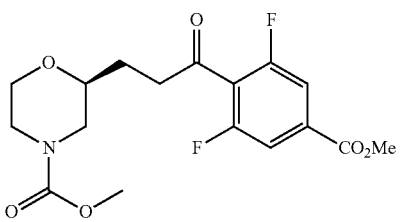 [SMILES: COC(=O)c1cc(F)c(C(=O)CC[C@H]2CN(C(=O)OC)CCO2)c(F)c1]

with a brominating agent. In some embodiments, the brominating agent is copper(II) bromide. In some embodiments, the brominating agent is liquid bromine.

In some embodiments of a process for the preparation of methyl (S)-2-((2-(2,6-difluoro-4-(methylcarbamoyl)phenyl)-7-methylimidazo[1,2-a]pyridin-3-yl)methyl)morpholine-4-carboxylate (Compound 1), the compound with the structure:

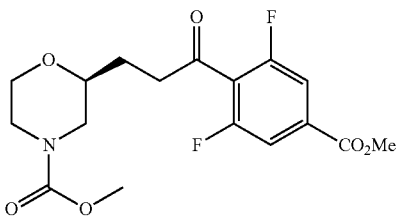 [SMILES: COC(=O)c1cc(F)c(C(=O)CC[C@H]2CN(C(=O)OC)CCO2)c(F)c1]

is prepared by a process comprising contacting a compound with the structure:

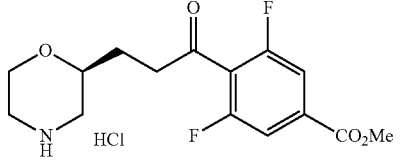 [SMILES: COC(=O)c1cc(F)c(C(=O)CC[C@H]2CNCCO2)c(F)c1 ; Cl]

with methyl chloroformate and a base. In some embodiments, the base is sodium bicarbonate.

In some embodiments of a process for the preparation of methyl (S)-2-((2-(2,6-difluoro-4-(methylcarbamoyl)phenyl)-7-methylimidazo[1,2-a]pyridin-3-yl)methyl)morpholine-4-carboxylate (Compound 1), the compound with the structure:

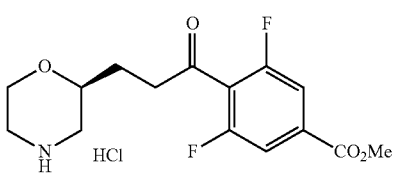 [SMILES: COC(=O)c1cc(F)c(C(=O)CC[C@H]2CNCCO2)c(F)c1 ; Cl]

is prepared by a process comprising contacting a compound with the structure:

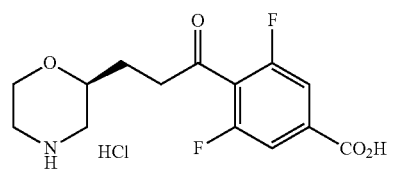 [SMILES: O=C(O)c1cc(F)c(C(=O)CC[C@H]2CNCCO2)c(F)c1 ; Cl]

with hydrogen chloride and methanol.

In some embodiments of a process for the preparation of methyl (S)-2-((2-(2,6-difluoro-4-(methylcarbamoyl)phenyl)-7-methylimidazo[1,2-a]pyridin-3-yl)methyl)morpholine-4-carboxylate (Compound 1), the compound with the structure:

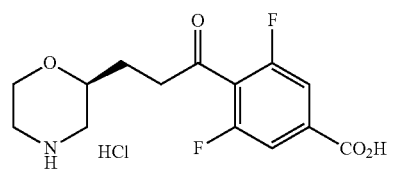 [SMILES: O=C(O)c1cc(F)c(C(=O)CC[C@H]2CNCCO2)c(F)c1 ; Cl]

is prepared by a process comprising contacting a compound with the structure:

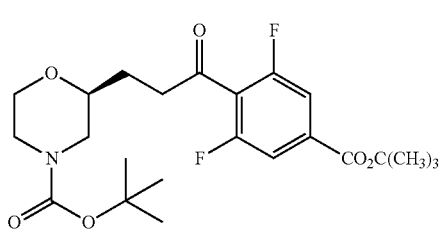

with hydrogen chloride in the presence of a solvent. In some embodiments, the solvent is ethyl acetate.

In some embodiments of a process for the preparation of methyl (S)-2-((2-(2,6-difluoro-4-(methylcarbamoyl)phenyl)-7-methylimidazo[1,2-a]pyridin-3-yl)methyl)morpholine-4-carboxylate (Compound 1), the compound with the structure:

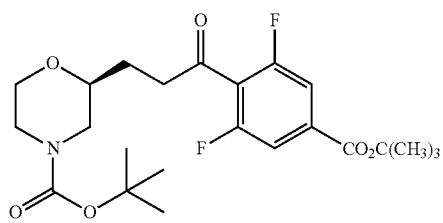

is prepared by a process comprising contacting a compound with the structure:

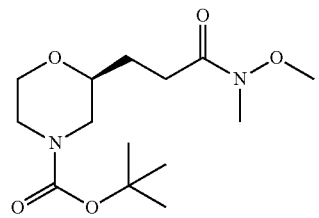

with tert-butyl 3,5-difluorobenzoate and a base. In some embodiments, the base is lithium diisopropylamide.

In some embodiments of a process for the preparation of methyl (S)-2-((2-(2,6-difluoro-4-(methylcarbamoyl)phenyl)-7-methylimidazo[1,2-a]pyridin-3-yl)methyl)morpholine-4-carboxylate (Compound 1), the compound with the structure:

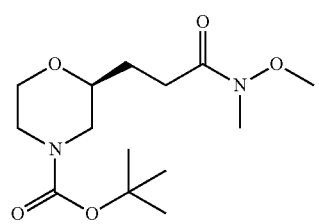 [SMILES: CON(C)C(=O)CC[C@H]1CN(C(=O)OC(C)(C)C)CCO1]

is prepared by a process comprising contacting a compound with the structure:

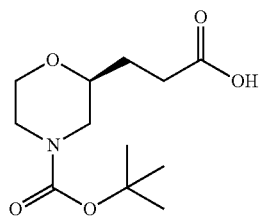 [SMILES: CC(C)(C)OC(=O)N1CCO[C@@H](CCC(=O)O)C1]

with N,O-dimethylhydroxylamine, an amide coupling reagent, and 1-hydroxybenzotriazole. In some embodiments, the amide coupling reagent is 1-ethyl-3-(3-dimethylaminopropyl)carbodiimide.

In some embodiments of a process for the preparation of methyl (S)-2-((2-(2,6-difluoro-4-(methylcarbamoyl)phenyl)-7-methylimidazo[1,2-a]pyridin-3-yl)methyl)morpholine-4-carboxylate (Compound 1), the compound with the structure:

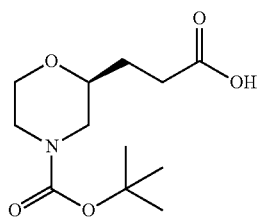 [SMILES: CC(C)(C)OC(=O)N1CCO[C@@H](CCC(=O)O)C1]

is prepared by a process comprising contacting a compound with the structure:

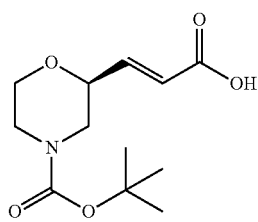 [SMILES: CC(C)(C)OC(=O)N1CCO[C@@H](/C=C/C(=O)O)C1]

with a hydrogenation catalyst and hydrogen. In some embodiments, the hydrogenation catalyst is palladium on carbon, palladium hydroxide, rhodium on carbon, rhodium on alumina, platinum oxide, or platinum on carbon. In some embodiments, the hydrogenation catalyst is palladium on carbon.

In some embodiments of a process for the preparation of methyl (S)-2-((2-(2,6-difluoro-4-(methylcarbamoyl)phenyl)-7-methylimidazo[1,2-a]pyridin-3-yl)methyl)morpholine-4-carboxylate (Compound 1), the compound with the structure:

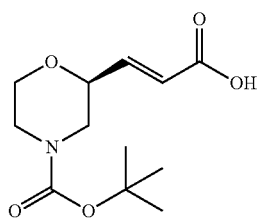 [SMILES: CC(C)(C)OC(=O)N1CCO[C@@H](/C=C/C(=O)O)C1]

is prepared by a process comprising contacting a compound with the structure:

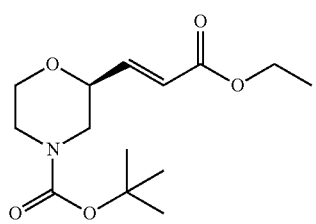 [SMILES: CCOC(=O)/C=C/[C@H]1CN(C(=O)OC(C)(C)C)CCO1]

with a base in aqueous tetrahydrofuran. In some embodiments, the base is sodium hydroxide.

In some embodiments of a process for the preparation of methyl (S)-2-((2-(2,6-difluoro-4-(methylcarbamoyl)phenyl)-7-methylimidazo[1,2-a]pyridin-3-yl)methyl)morpholine-4-carboxylate (Compound 1), the compound with the structure:

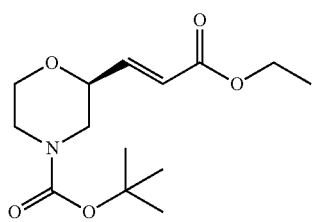 [SMILES: CCOC(=O)/C=C/[C@H]1CN(C(=O)OC(C)(C)C)CCO1]

is prepared by a process comprising contacting a compound with the structure:

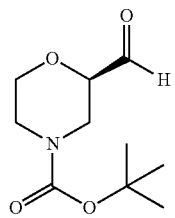

with (carbethoxymethylene)triphenylphosphorane.

In some embodiments of a process for the preparation of methyl (S)-2-((2-(2,6-difluoro-4-(methylcarbamoyl)phenyl)-7-methylimidazo[1,2-a]pyridin-3-yl)methyl)morpholine-4-carboxylate (Compound 1), the compound with the structure:

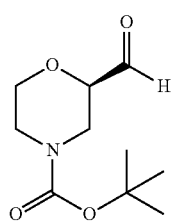

is prepared by a process comprising contacting a compound with the structure:

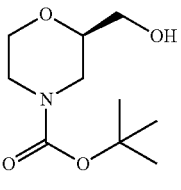

with 2,2,6,6-tetramethylpiperidine 1-oxyl or with T3P.

Further disclosed herein, is a process for the preparation of methyl (S)-2-((2-(2,6-difluoro-4-(methylcarbamoyl)phenyl)-7-methylimidazo[1,2-a]pyridin-3-yl)methyl)morpholine-4-carboxylate (Compound 1), comprising:

A) the reaction of a compound with the structure:

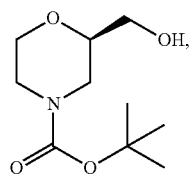

with 2,2,6,6-tetramethylpiperidine 1-oxyl or T3P to produce a compound with the structure:

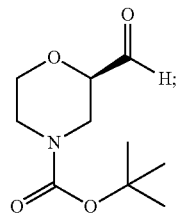

B) followed by the reaction of the compounds with the structures:

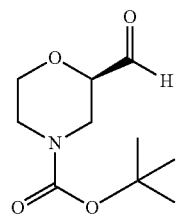 and 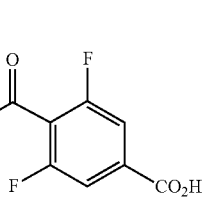

with a mixture of potassium bicarbonate and potassium carbonate to produce a compound with the structure:

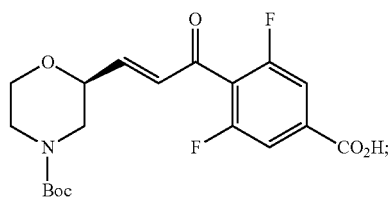 [SMILES: CC(C)(C)OC(=O)N1CCO[C@@H](/C=C/C(=O)c2c(F)cc(C(=O)O)cc2F)C1]

C) followed by the reaction of the compound with the structure:

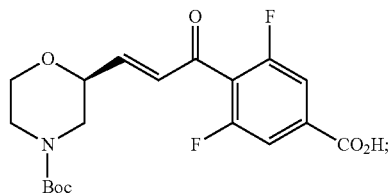 [SMILES: CC(C)(C)OC(=O)N1CCO[C@@H](/C=C/C(=O)c2c(F)cc(C(=O)O)cc2F)C1]

with palladium on carbon and hydrogen to produce a compound with the structure:

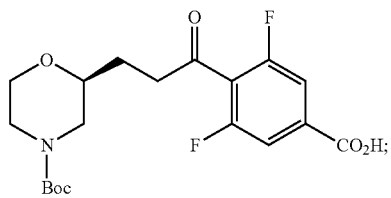 [SMILES: CC(C)(C)OC(=O)N1CCO[C@@H](CCC(=O)c2c(F)cc(C(=O)O)cc2F)C1]

D) followed by the reaction of the compound with the structure:

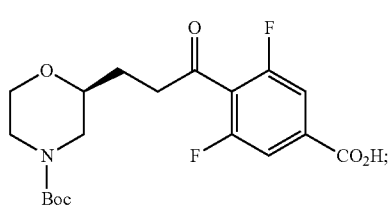 [SMILES: CC(C)(C)OC(=O)N1CCO[C@@H](CCC(=O)c2c(F)cc(C(=O)O)cc2F)C1]

with hydrogen chloride in ethyl acetate to produce a compound with the structure;

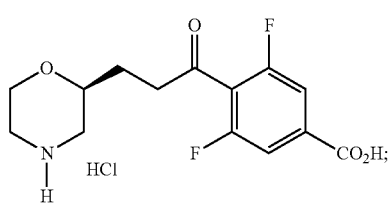 [SMILES: O=C(O)c1cc(F)c(C(=O)CC[C@H]2CNCCO2)c(F)c1 ; Cl]

E) followed by the reaction of the compound with the structure:

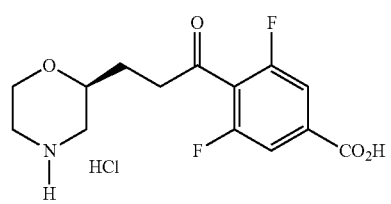 [SMILES: O=C(O)c1cc(F)c(C(=O)CC[C@H]2CNCCO2)c(F)c1 ; Cl]

with methyl chloroformate and sodium bicarbonate to produce a compound with the structure:

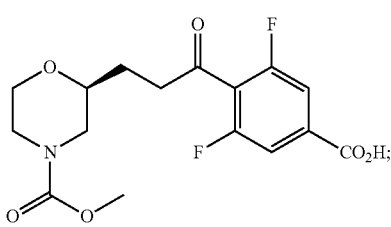 [SMILES: COC(=O)N1CCO[C@@H](CCC(=O)c2c(F)cc(C(=O)O)cc2F)C1]

F) followed by the reaction of the compound with the structure:

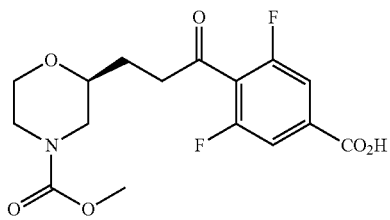 [SMILES: COC(=O)N1CCO[C@@H](CCC(=O)c2c(F)cc(C(=O)O)cc2F)C1]

with N-bromosuccinimide in the presence of acid to produce a compound with the structure:

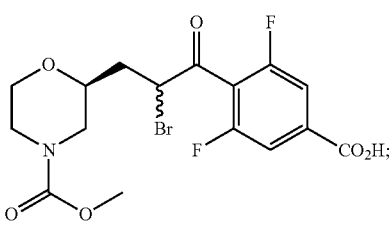 [SMILES: COC(=O)N1CCO[C@@H](CC(Br)C(=O)c2c(F)cc(C(=O)O)cc2F)C1]

G) followed by the reaction of the compound with the structure:

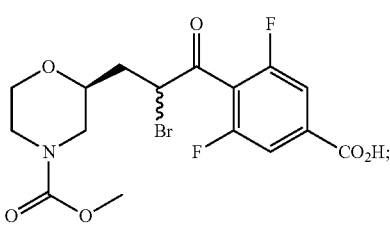 [SMILES: COC(=O)N1CCO[C@@H](CC(Br)C(=O)c2c(F)cc(C(=O)O)cc2F)C1]

with 2-amino-4-methylpyridine and optionally sodium borohydride to produce a compound with the structure:

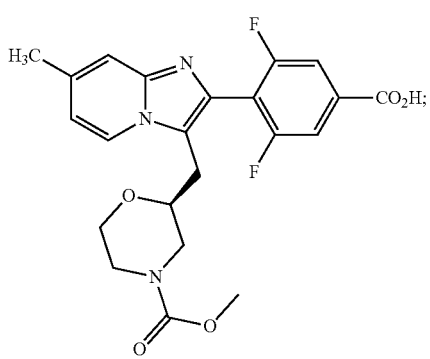 [SMILES: COC(=O)N1CCO[C@@H](Cc2c(-c3c(F)cc(C(=O)O)cc3F)nc3cc(C)ccn23)C1]

H) followed by the reaction of the compound with the structure:

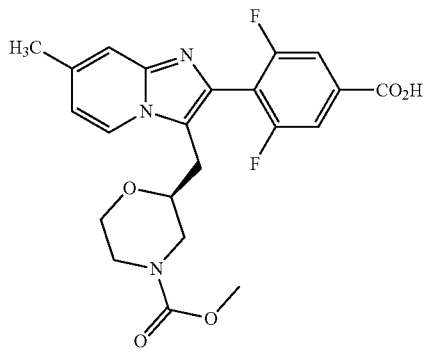 [SMILES: COC(=O)N1CCO[C@@H](Cc2c(-c3c(F)cc(C(=O)O)cc3F)nc3cc(C)ccn23)C1]

with carbonyldiimidazole and methylamine to produce a compound with the structure:

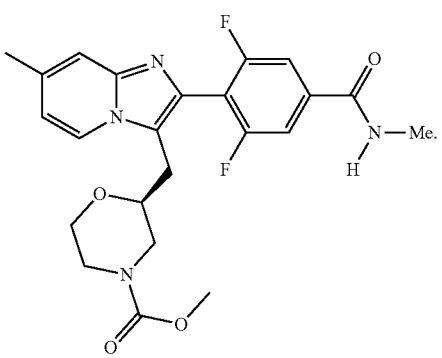 [SMILES: CNC(=O)c1cc(F)c(-c2nc3cc(C)ccn3c2C[C@H]2CN(C(=O)OC)CCO2)c(F)c1]

Further disclosed herein, is a process for the preparation of methyl (S)-2-((2-(2,6-difluoro-4-(methylcarbamoyl)phenyl)-7-methylimidazo[1,2-a]pyridin-3-yl)methyl)morpholine-4-carboxylate (Compound 1), comprising:

A) the reaction of a compound with the structure:

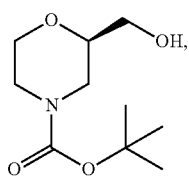

with 2,2,6,6-tetramethylpiperidine 1-oxyl or T3P to produce a compound with the structure:

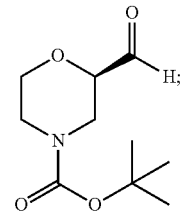

B) followed by the reaction of the compound with the structure:

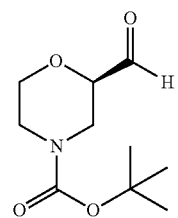

with (carbethoxymethylene)triphenylphosphorane to produce a compound with the structure:

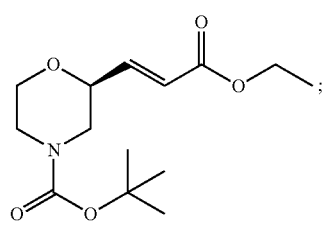 [SMILES: CCOC(=O)/C=C/[C@H]1CN(C(=O)OC(C)(C)C)CCO1]

C) followed by the reaction of the compound with the structure:

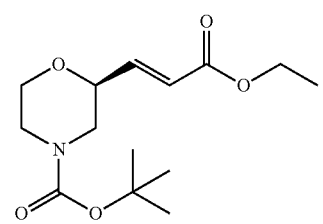 [SMILES: CCOC(=O)/C=C/[C@H]1CN(C(=O)OC(C)(C)C)CCO1]

with sodium hydroxide in aqueous tetrahydrofuran to produce a compound with the structure:

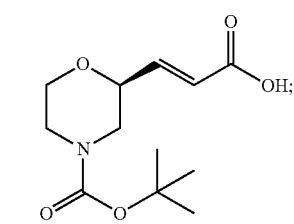 [SMILES: CC(C)(C)OC(=O)N1CCO[C@@H](/C=C/C(=O)O)C1]

D) followed by the reaction of the compound with the structure:

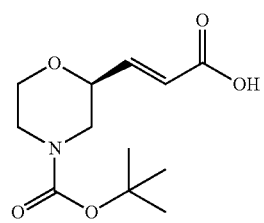 [SMILES: CC(C)(C)OC(=O)N1CCO[C@@H](/C=C/C(=O)O)C1]

with palladium on carbon and hydrogen to produce a compound with the structure;

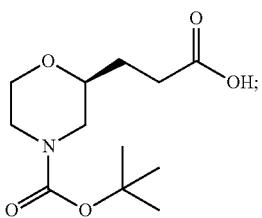 [SMILES: CC(C)(C)OC(=O)N1CCO[C@@H](CCC(=O)O)C1]

E) followed by the reaction of the compound with the structure:

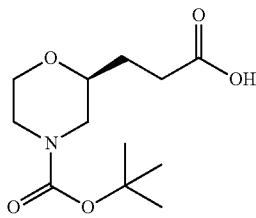 [SMILES: CC(C)(C)OC(=O)N1CCO[C@@H](CCC(=O)O)C1]

with N,O-dimethylhydroxylamine, 1-ethyl-3-(3-dimethylaminopropyl)carbodiimide, and 1-hydroxybenzotriazole to produce a compound with the structure:

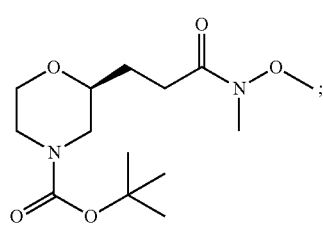 [SMILES: CON(C)C(=O)CC[C@H]1CN(C(=O)OC(C)(C)C)CCO1]

F) followed by the reaction of the compound with the structure:

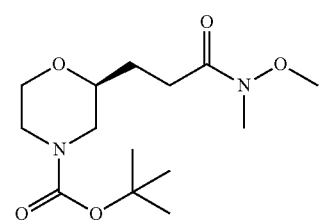 [SMILES: CON(C)C(=O)CC[C@H]1CN(C(=O)OC(C)(C)C)CCO1]

with tert-butyl 3,5-difluorobenzoate and lithium diisopropylamide to produce a compound with the structure:

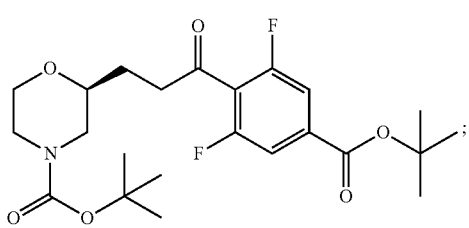 [SMILES: CC(C)(C)OC(=O)c1cc(F)c(C(=O)CC[C@H]2CN(C(=O)OC(C)(C)C)CCO2)c(F)c1]

G) followed by the reaction of the compound with the structure:

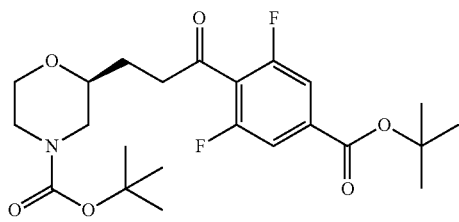 [SMILES: CC(C)(C)OC(=O)c1cc(F)c(C(=O)CC[C@H]2CN(C(=O)OC(C)(C)C)CCO2)c(F)c1]

with hydrogen chloride in ethyl acetate to produce a compound with the structure:

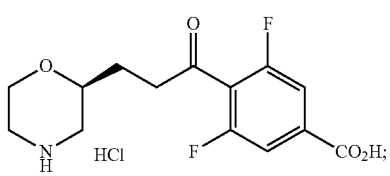 [SMILES: O=C(O)c1cc(F)c(C(=O)CC[C@H]2CNCCO2)c(F)c1 ; Cl]

H) followed by the reaction of the compound with the structure:

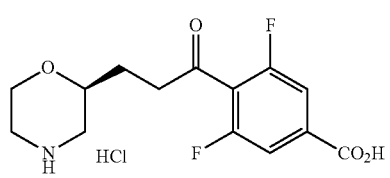 [SMILES: O=C(O)c1cc(F)c(C(=O)CC[C@H]2CNCCO2)c(F)c1 ; Cl]

with hydrogen chloride and methanol to produce a compound with the structure:

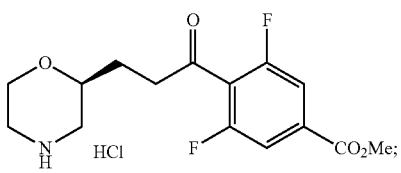 [SMILES: COC(=O)c1cc(F)c(C(=O)CC[C@H]2CNCCO2)c(F)c1 ; Cl]

I) followed by the reaction of the compound with the structure:

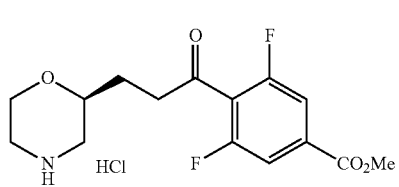 [SMILES: COC(=O)c1cc(F)c(C(=O)CC[C@H]2CNCCO2)c(F)c1 ; Cl]

with methyl chloroformate and sodium bicarbonate to produce a compound with the structure:

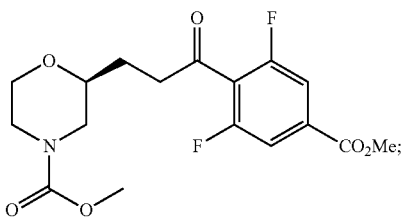 [SMILES: COC(=O)c1cc(F)c(C(=O)CC[C@H]2CN(C(=O)OC)CCO2)c(F)c1]

J) followed by the reaction of the compound with the structure:

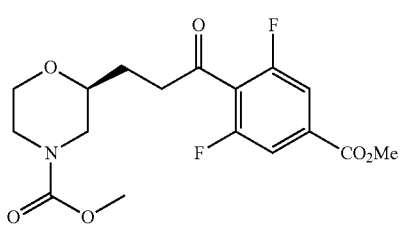 [SMILES: COC(=O)c1cc(F)c(C(=O)CC[C@H]2CN(C(=O)OC)CCO2)c(F)c1]

with copper(II) bromide to produce a compound with the structure:

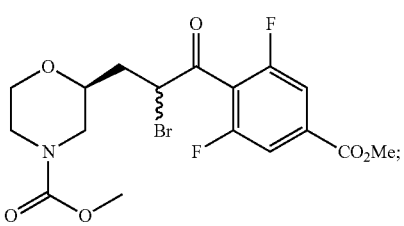 [SMILES: COC(=O)c1cc(F)c(C(=O)C(Br)C[C@H]2CN(C(=O)OC)CCO2)c(F)c1]

K) followed by the reaction of the compound with the structure:

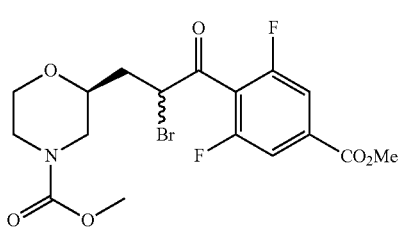 [SMILES: COC(=O)c1cc(F)c(C(=O)C(Br)C[C@H]2CN(C(=O)OC)CCO2)c(F)c1]

with 2-amino-4-methylpyridine to produce a compound with the structure:

21

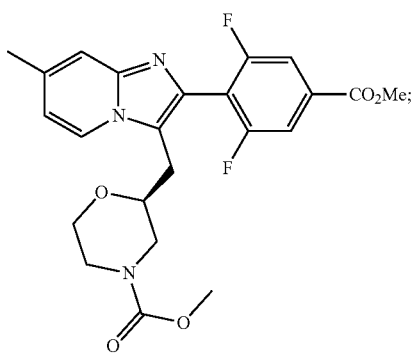 [SMILES: COC(=O)c1cc(F)c(-c2nc3cc(C)ccn3c2C[C@H]2CN(C(=O)OC)CCO2)c(F)c1]

L) followed by the reaction of the compound with the structure:

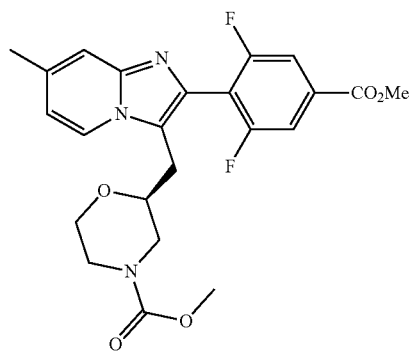 [SMILES: COC(=O)c1cc(F)c(-c2nc3cc(C)ccn3c2C[C@H]2CN(C(=O)OC)CCO2)c(F)c1]

with lithium hydroxide in aqueous tetrahydrofuran and then sodium borohydride to produce a compound with the structure:

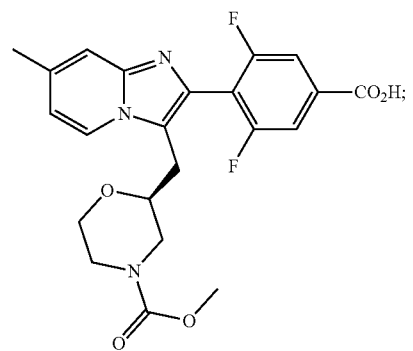 [SMILES: COC(=O)N1CCO[C@@H](Cc2c(-c3c(F)cc(C(=O)O)cc3F)nc3cc(C)ccn23)C1]

M) followed by the reaction of the compound with the structure:

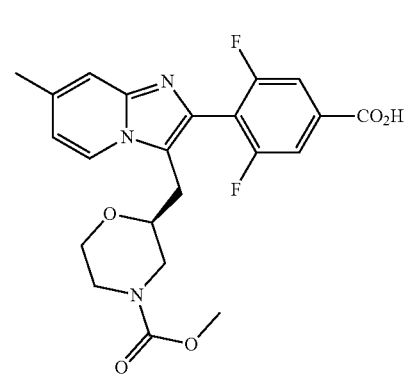 [SMILES: COC(=O)N1CCO[C@@H](Cc2c(-c3c(F)cc(C(=O)O)cc3F)nc3cc(C)ccn23)C1]

22 with carbonyldiimidazole and methylamine to produce a compound with the structure:

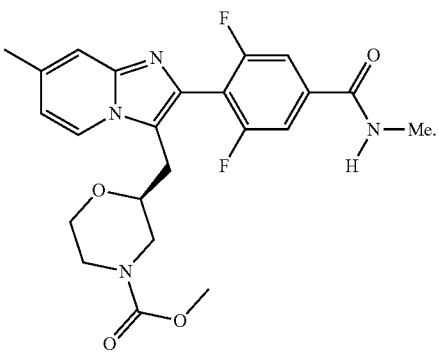 [SMILES: CNC(=O)c1cc(F)c(-c2nc3cc(C)ccn3c2C[C@H]2CN(C(=O)OC)CCO2)c(F)c1]

Further disclosed herein is a compound having the structure:

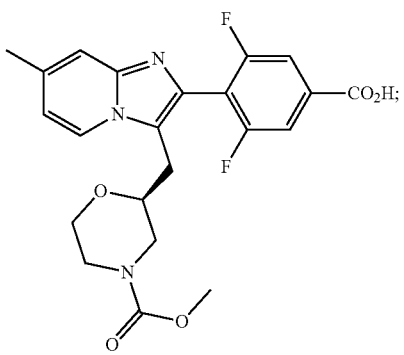 [SMILES: COC(=O)N1CCO[C@@H](Cc2c(-c3c(F)cc(C(=O)O)cc3F)nc3cc(C)ccn23)C1]

or a pharmaceutically acceptable salt thereof.

Further disclosed herein is a compound having the structure:

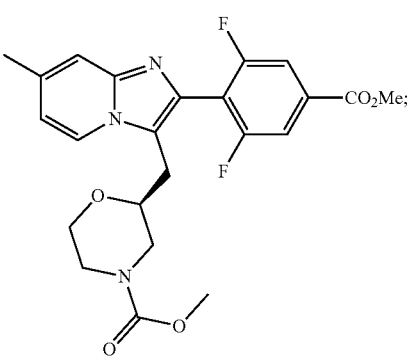 [SMILES: COC(=O)c1cc(F)c(-c2nc3cc(C)ccn3c2C[C@H]2CN(C(=O)OC)CCO2)c(F)c1]

or a pharmaceutically acceptable salt thereof.

Further disclosed herein is a compound having the structure:

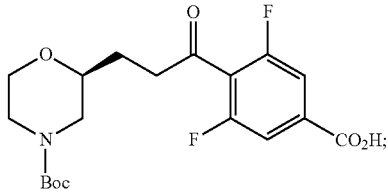 [SMILES: CC(C)(C)OC(=O)N1CCO[C@@H](CCC(=O)c2c(F)cc(C(=O)O)cc2F)C1]

or a pharmaceutically acceptable salt thereof.

Further disclosed herein is a compound having the structure:

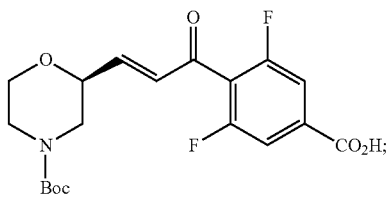 [SMILES: CC(C)(C)OC(=O)N1CCO[C@@H](/C=C/C(=O)c2c(F)cc(C(=O)O)cc2F)C1]

or a pharmaceutically acceptable salt thereof.

Further disclosed herein is a compound having the structure:

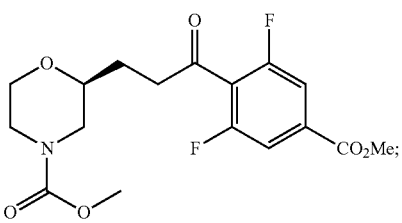 [SMILES: COC(=O)c1cc(F)c(C(=O)CC[C@H]2CN(C(=O)OC)CCO2)c(F)c1]

or a pharmaceutically acceptable salt thereof.

Further disclosed herein is a compound having the structure:

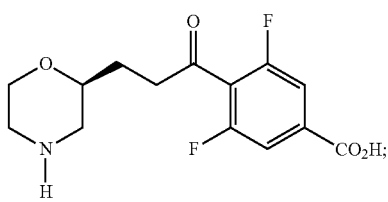 [SMILES: O=C(O)c1cc(F)c(C(=O)CC[C@H]2CNCCO2)c(F)c1]

or a pharmaceutically acceptable salt thereof.

Further disclosed herein is a compound having the structure:

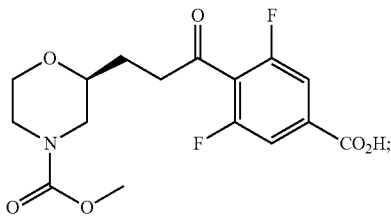 [SMILES: COC(=O)N1CCO[C@@H](CCC(=O)c2c(F)cc(C(=O)O)cc2F)C1]

or a pharmaceutically acceptable salt thereof.

Further disclosed herein is a compound having the structure:

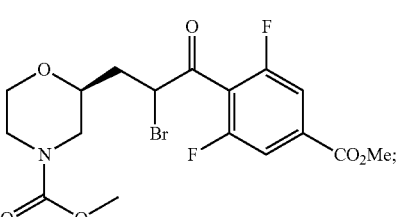

or a pharmaceutically acceptable salt thereof.

Further disclosed herein is a compound having the structure:

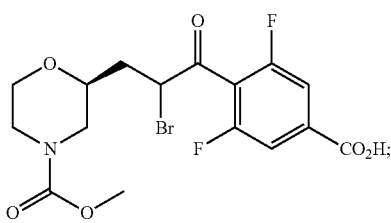 [SMILES: COC(=O)N1CCO[C@@H](CC(Br)C(=O)c2c(F)cc(C(=O)O)cc2F)C1]

or a pharmaceutically acceptable salt thereof.

Further disclosed herein is a compound having the structure:

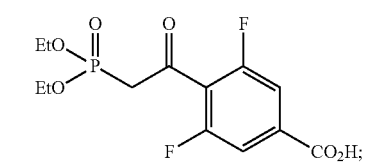

or a pharmaceutically acceptable salt thereof.

INCORPORATION BY REFERENCE

All publications, patents, and patent applications mentioned in this specification are herein incorporated by reference to the same extent as if each individual publication, patent, or patent application was specifically and individually indicated to be incorporated by reference.

DETAILED DESCRIPTION OF THE INVENTION

Good manufacturing practices are usually required for large scale manufacture of clinically useful drug candidates.

Provided herein are certain processes and methods for the manufacture of methyl (S)-2-((2-(2,6-difluoro-4-(methylcarbamoyl)phenyl)-7-methylimidazo[1,2-a]pyridin-3-yl)methyl)morpholine-4-carboxylate (Compound 1), or a pharmaceutically acceptable salt thereof.

Definitions

As used in the specification and appended claims, unless specified to the contrary, the following terms have the meaning indicated below.

As used herein and in the appended claims, the singular forms "a," "and," and "the" include plural referents unless the context clearly dictates otherwise. Thus, for example, reference to "an agent" includes a plurality of such agents, and reference to "the cell" includes reference to one or more cells (or to a plurality of cells) and equivalents thereof.

When ranges are used herein for physical properties, such as molecular weight, or chemical properties, such as chemical formulae, all combinations and subcombinations of ranges and specific embodiments therein are intended to be included.

The term "about" when referring to a number or a numerical range means that the number or numerical range referred to is an approximation within experimental variability (or within statistical experimental error), and thus the number or numerical range varies between 1% and 15% of the stated number or numerical range.

The term "comprising" (and related terms such as "comprise" or "comprises" or "having" or "including") is not intended to exclude that which in other certain embodiments, for example, an embodiment of any composition of matter, composition, method, or process, or the like, described herein, "consist of" or "consist essentially of" the described features.

The term "subject" or "patient" encompasses mammals and non-mammals. Examples of mammals include, but are not limited to, any member of the Mammalian class: humans, non-human primates such as chimpanzees, and other apes and monkey species; farm animals such as cattle, horses, sheep, goats, swine; domestic animals such as rabbits, dogs, and cats; laboratory animals including rodents, such as rats, mice and guinea pigs, and the like. Examples of non-mammals include, but are not limited to, birds, fish and the like. In one embodiment of the methods and compositions provided herein, the mammal is a human.

As used herein, "treatment" or "treating" or "palliating" or "ameliorating" are used interchangeably herein. These terms refers to an approach for obtaining beneficial or desired results including but not limited to therapeutic benefit and/or a prophylactic benefit. By "therapeutic benefit" is meant eradication or amelioration of the underlying disorder being treated. Also, a therapeutic benefit is achieved with the eradication or amelioration of one or more of the physiological symptoms associated with the underlying disorder such that an improvement is observed in the patient, notwithstanding that the patient is still afflicted with the underlying disorder. For prophylactic benefit, the compositions are administered to a patient at risk of developing a particular disease, or to a patient reporting one or more of the physiological symptoms of a disease, even though a diagnosis of this disease has been made.

"Pharmaceutically acceptable salt" includes both acid and base addition salts. A pharmaceutically acceptable salt of any one of the compounds described herein is intended to encompass any and all pharmaceutically suitable salt forms. Preferred pharmaceutically acceptable salts of the compounds described herein are pharmaceutically acceptable acid addition salts and pharmaceutically acceptable base addition salts.

"Pharmaceutically acceptable acid addition salt" refers to those salts which retain the biological effectiveness and properties of the free bases, which are not biologically or otherwise undesirable, and which are formed with inorganic acids such as hydrochloric acid, hydrobromic acid, sulfuric acid, nitric acid, phosphoric acid, hydroiodic acid, hydrofluoric acid, phosphorous acid, and the like. Also included are salts that are formed with organic acids such as aliphatic mono- and dicarboxylic acids, phenyl-substituted alkanoic acids, hydroxy alkanoic acids, alkanedioic acids, aromatic acids, aliphatic and. aromatic sulfonic acids, etc. and include, for example, acetic acid, trifluoroacetic acid, propionic acid, glycolic acid, pyruvic acid, oxalic acid, maleic acid, malonic acid, succinic acid, fumaric acid, tartaric acid, citric acid, benzoic acid, cinnamic acid, mandelic acid, methanesulfonic acid, ethanesulfonic acid, p-toluenesulfonic acid, salicylic acid, and the like. Exemplary salts thus include sulfates, pyrosulfates, bisulfates, sulfites, bisulfites, nitrates, phosphates, monohydrogenphosphates, dihydrogenphosphates, metaphosphates, pyrophosphates, chlorides, bromides, iodides, acetates, trifluoroacetates, propionates, caprylates, isobutyrates, oxalates, malonates, succinate suberates, sebacates, fumarates, maleates, mandelates, benzoates, chlorobenzoates, methylbenzoates, dinitrobenzoates, phthalates, benzenesulfonates, toluenesulfonates, phenylacetates, citrates, lactates, malates, tartrates, methanesulfonates, and the like. Also contemplated are salts of amino acids, such as arginates, gluconates, and galacturonates (see, for example, Berge S. M. et al., "Pharmaceutical Salts," Journal of Pharmaceutical Science, 66:1-19 (1997)). Acid addition salts of basic compounds are prepared by contacting the free base forms with a sufficient amount of the desired acid to produce the salt.

"Pharmaceutically acceptable base addition salt" refers to those salts that retain the biological effectiveness and properties of the free acids, which are not biologically or otherwise undesirable. These salts are prepared from addition of an inorganic base or an organic base to the free acid. In some embodiments, pharmaceutically acceptable base addition salts are formed with metals or amines, such as alkali and alkaline earth metals or organic amines. Salts derived from inorganic bases include, but are not limited to, sodium, potassium, lithium, ammonium, calcium, magnesium, iron, zinc, copper, manganese, aluminum salts and the like. Salts derived from organic bases include, but are not limited to, salts of primary, secondary, and tertiary amines, substituted amines including naturally occurring substituted amines, cyclic amines and basic ion exchange resins, for example, isopropylamine, trimethylamine, diethylamine, triethylamine, tripropylamine, ethanolamine, diethanolamine, 2-dimethylaminoethanol, 2-diethylaminoethanol, dicyclohexylamine, lysine, arginine, histidine, caffeine, procaine, N,N-dibenzylethylenediamine, chloroprocaine, hydrabamine, choline, betaine, ethylenediamine, ethylenedianiline, N-methylglucamine, glucosamine, methylglucamine, theobromine, purines, piperazine, piperidine, N-ethylpiperidine, polyamine resins and the like. See Berge et al., supra.

The term "pharmaceutical combination" as used herein, means a product that results from the mixing or combining of more than one active ingredient and includes both fixed and non-fixed combinations of the active ingredients. The term "fixed combination" means that the active ingredients, are both administered to a patient simultaneously in the form of a single entity or dosage. The term "non-fixed combination" means that the active ingredients, are administered to a patient as separate entities either simultaneously, concurrently or sequentially with no specific intervening time limits, wherein such administration provides effective levels of the two compounds in the body of the patient. The latter also applies to cocktail therapy, e.g. the administration of three or more active ingredients.

The terms "co-administration" or the like, as used herein, are meant to encompass administration of the selected therapeutic agents to a single patient, and are intended to include treatment regimens in which the agents are administered by the same or different route of administration or at the same or different time.

The term "activator" is used in this specification to denote any molecular species that results in activation of the indicated receptor, regardless of whether the species itself binds to the receptor or a metabolite of the species binds to the receptor when the species is administered topically. Thus, the activator can be a ligand of the receptor or it can be an activator that is metabolized to the ligand of the receptor, i.e., a metabolite that is formed in tissue and is the actual ligand.

The term "antagonist" as used herein, refers to a small-molecule agent that binds to a nuclear hormone receptor and subsequently decreases the agonist induced transcriptional activity of the nuclear hormone receptor.

The term "agonist" as used herein, refers to a small-molecule agent that binds to a nuclear hormone receptor and subsequently increases nuclear hormone receptor transcriptional activity in the absence of a known agonist.

The term "inverse agonist" as used herein, refers to a small-molecule agent that binds to a nuclear hormone receptor and subsequently decreases the basal level of nuclear hormone receptor transcriptional activity that is present in the absence of a known agonist.

The term "modulate," as used herein, means to interact with a target protein either directly or indirectly so as to alter the activity of the target protein, including, by way of example only, to inhibit the activity of the target, or to limit or reduce the activity of the target.

As used herein, the term "modulator" refers to a compound that alters an activity of a target. For example, a modulator can cause an increase or decrease in the magnitude of a certain activity of a target compared to the magnitude of the activity in the absence of the modulator. In certain embodiments, a modulator is an inhibitor, which decreases the magnitude of one or more activities of a target. In certain embodiments, an inhibitor completely prevents one or more activities of a target.

Compounds

In some embodiments, the P2X3 antagonist described herein is methyl (S)-2-((2-(2,6-difluoro-4-(methylcarbamoyl)phenyl)-7-methylimidazo[1,2-a]pyridin-3-yl)methyl)morpholine-4-carboxylate (Compound 1), or a pharmaceutically acceptable salt thereof. Compound 1 has the structure:

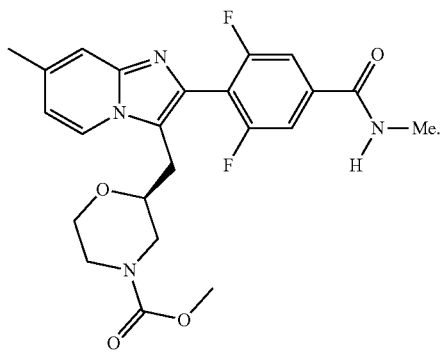 [SMILES: CNC(=O)c1cc(F)c(-c2nc3cc(C)ccn3c2C[C@H]2CN(C(=O)OC)CCO2)c(F)c1]

In some embodiments, the starting material for the synthesis of Compound 1 is

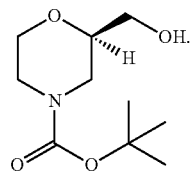

In some embodiments, an intermediate in the synthesis of Compound 1 is

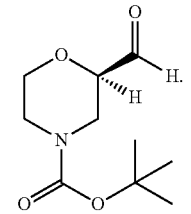

In some embodiments, an intermediate in the synthesis of Compound 1 is

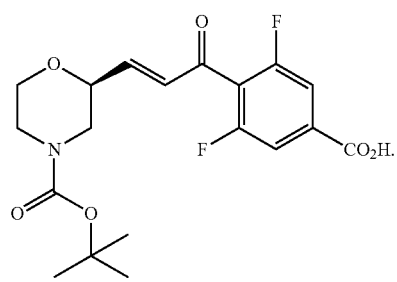

In some embodiments, an intermediate in the synthesis of Compound 1 is

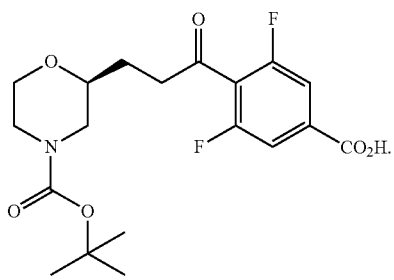

In some embodiments, an intermediate in the synthesis of Compound 1 is

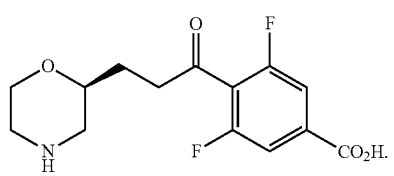 [SMILES: O=C(O)c1cc(F)c(C(=O)CC[C@H]2CNCCO2)c(F)c1]

In some embodiments, an intermediate in the synthesis of Compound 1 is

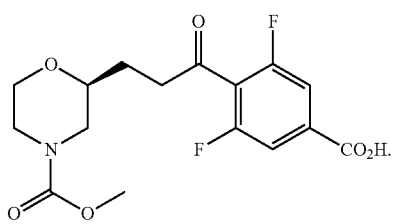 [SMILES: COC(=O)N1CCO[C@@H](CCC(=O)c2c(F)cc(C(=O)O)cc2F)C1]

In some embodiments, an intermediate in the synthesis of Compound 1 is

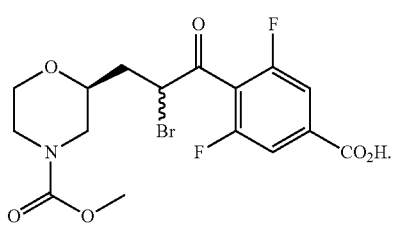 [SMILES: COC(=O)N1CCO[C@@H](CC(Br)C(=O)c2c(F)cc(C(=O)O)cc2F)C1]

In some embodiments, an intermediate in the synthesis of Compound 1 is

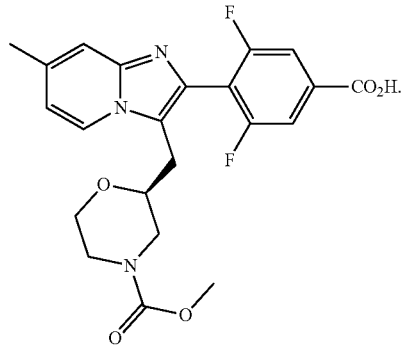 [SMILES: COC(=O)N1CCO[C@@H](Cc2c(-c3c(F)cc(C(=O)O)cc3F)nc3cc(C)ccn23)C1]

In some embodiments, the P2X3 antagonist described herein is methyl (S)-2-((2-(2,6-difluoro-4-(methylcarbamoyl)phenyl)-7-methylimidazo[1,2-a]pyridin-3-yl)methyl)morpholine-4-carboxylate (Compound 1), or a pharmaceutically acceptable salt thereof. Compound 1 has the structure:

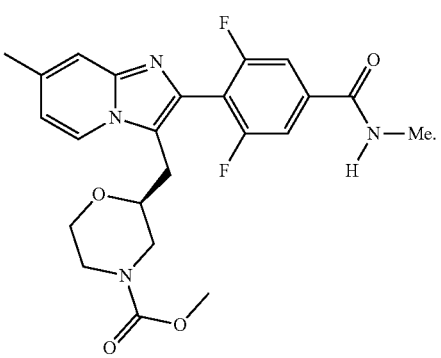 [SMILES: CNC(=O)c1cc(F)c(-c2nc3cc(C)ccn3c2C[C@H]2CN(C(=O)OC)CCO2)c(F)c1]

In some embodiments, the starting material for the synthesis of Compound 1 is

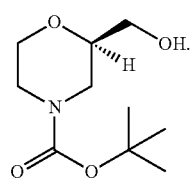

In some embodiments, an intermediate in the synthesis of Compound 1 is

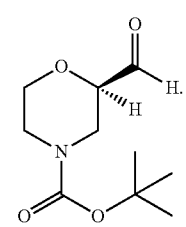

In some embodiments, an intermediate in the synthesis of Compound 1 is

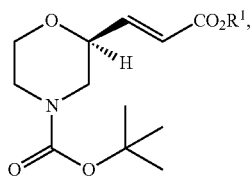

where R¹ is a straight chain or branched alkyl group comprising 1 to 8 carbon atoms. In some embodiments, an intermediate in the synthesis of Compound 1 is

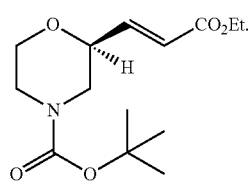 [SMILES: CCOC(=O)/C=C/[C@H]1CN(C(=O)OC(C)(C)C)CCO1]

In some embodiments, an intermediate in the synthesis of Compound 1 is

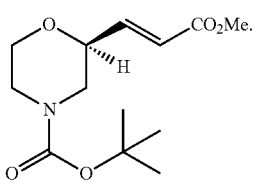 [SMILES: COC(=O)/C=C/[C@H]1CN(C(=O)OC(C)(C)C)CCO1]

In some embodiments, an intermediate in the synthesis of Compound 1 is

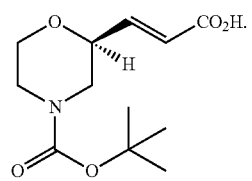 [SMILES: CC(C)(C)OC(=O)N1CCO[C@@H](/C=C/C(=O)O)C1]

In some embodiments, an intermediate in the synthesis of Compound 1 is

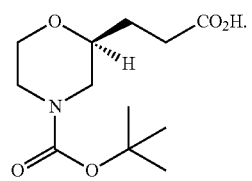 [SMILES: CC(C)(C)OC(=O)N1CCO[C@@H](CCC(=O)O)C1]

In some embodiments, an intermediate in the synthesis of Compound 1 is

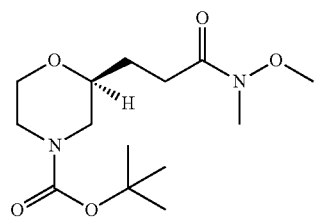

In some embodiments, an intermediate in the synthesis of Compound 1 is

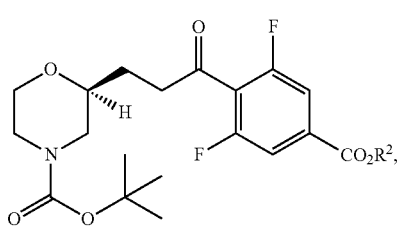

where R² is a branched alkyl group comprising 1 to 8 carbon atoms. In some embodiments, an intermediate in the synthesis of Compound 1 is

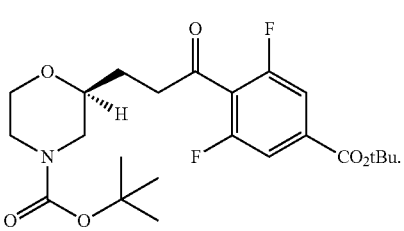 [SMILES: CC(C)(C)OC(=O)c1cc(F)c(C(=O)CC[C@H]2CN(C(=O)OC(C)(C)C)CCO2)c(F)c1]

In some embodiments, an intermediate in the synthesis of Compound 1 is

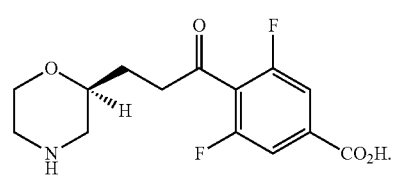 [SMILES: O=C(O)c1cc(F)c(C(=O)CC[C@H]2CNCCO2)c(F)c1]

In some embodiments, an intermediate in the synthesis of Compound 1 is

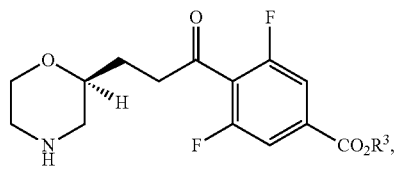

where R³ is a straight chain or branched alkyl group comprising 1 to 8 carbon atoms. In some embodiments, an intermediate in the synthesis of Compound 1 is

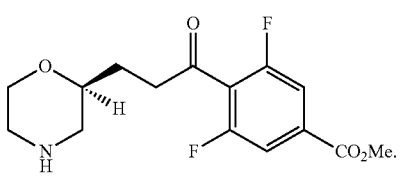 [SMILES: COC(=O)c1cc(F)c(C(=O)CC[C@H]2CNCCO2)c(F)c1]

In some embodiments, an intermediate in the synthesis of Compound 1 is

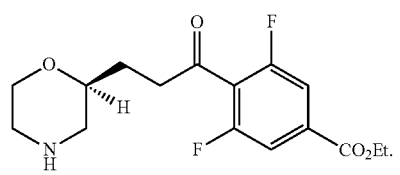 [SMILES: CCOC(=O)c1cc(F)c(C(=O)CC[C@H]2CNCCO2)c(F)c1]

In some embodiments an intermediate in the synthesis of Compound 1 is

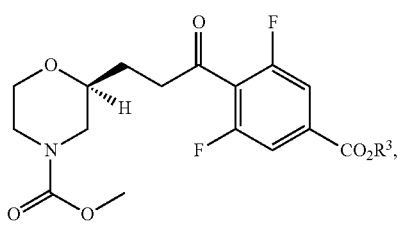

where R³ is hydrogen, or a straight chain or branched alkyl group comprising 1 to 8 carbon atoms. In some embodiments, an intermediate in the synthesis of Compound 1 is

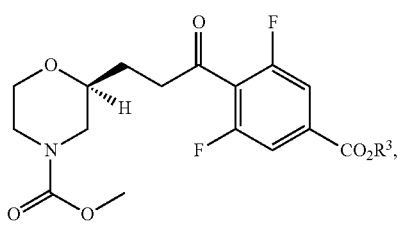

In some embodiments, an intermediate in the synthesis of Compound 1 is

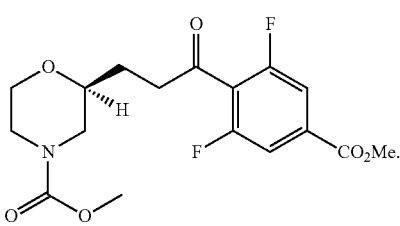 [SMILES: COC(=O)c1cc(F)c(C(=O)CC[C@H]2CN(C(=O)OC)CCO2)c(F)c1]

In some embodiments, an intermediate in the synthesis of Compound 1 is

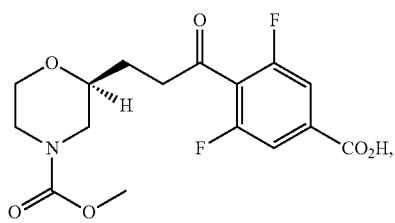 [SMILES: COC(=O)N1CCO[C@@H](CCC(=O)c2c(F)cc(C(=O)O)cc2F)C1]

In some embodiments, an intermediate in the synthesis of Compound 1 is

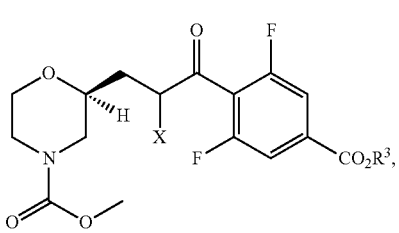

where X is Br, Cl, or I, and R³ is hydrogen, or a straight chain or branched alkyl group comprising 1 to 8 carbon atoms. In some embodiments, an intermediate in the synthesis of Compound 1 is

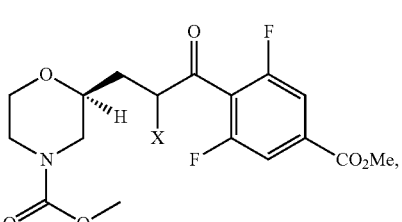

where X is Br, Cl, or I. In some embodiments, an intermediate in the synthesis of Compound 1 is

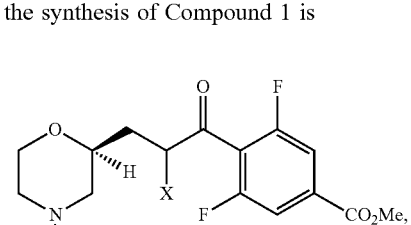

where X is Br. In some embodiments, an intermediate in the synthesis of Compound 1 is

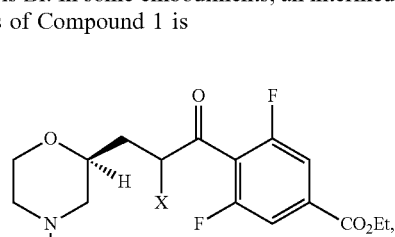

where X is Br, Cl, or I. In some embodiments, an intermediate in the synthesis of Compound 1 is

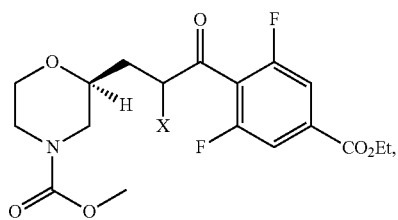

where X is Br. In some embodiments, an intermediate in the synthesis of Compound 1 is

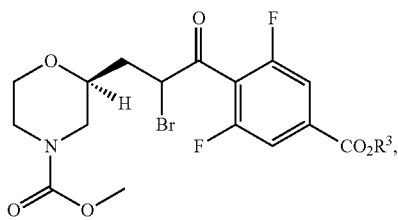

where $R^3$ is hydrogen, or a straight chain or branched alkyl group comprising 1 to 8 carbon atoms. In some embodiments, an intermediate in the synthesis of Compound 1 is

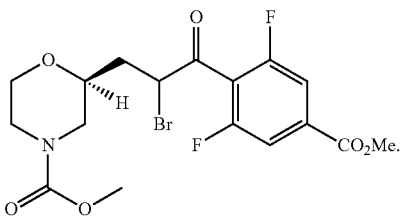

In some embodiments, an intermediate in the synthesis of Compound 1 is

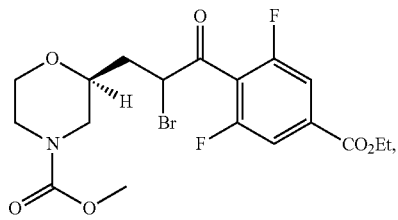 [SMILES: CCOC(=O)c1cc(F)c(C(=O)C(Br)C[C@H]2CN(C(=O)OC)CCO2)c(F)c1]

In some embodiments, an intermediate in the synthesis of Compound 1 is

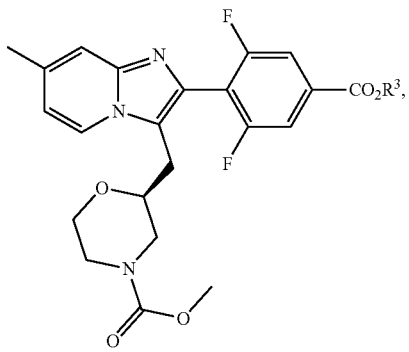

where $R^3$ is a straight chain or branched alkyl group comprising 1 to 8 carbon atoms. In some embodiments, an intermediate in the synthesis of Compound 1 is

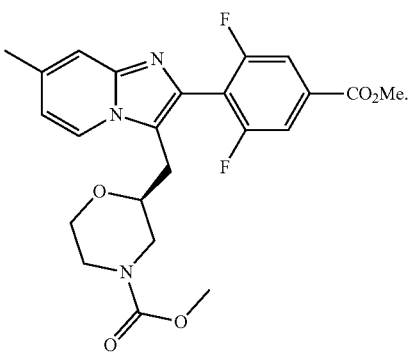 [SMILES: COC(=O)c1cc(F)c(-c2nc3cc(C)ccn3c2C[C@H]2CN(C(=O)OC)CCO2)c(F)c1]

In some embodiments, an intermediate in the synthesis of Compound 1 is

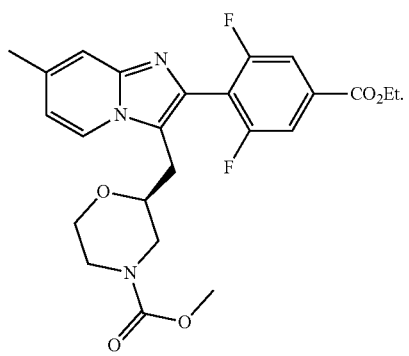 [SMILES: CCOC(=O)c1cc(F)c(-c2nc3cc(C)ccn3c2C[C@H]2CN(C(=O)OC)CCO2)c(F)c1]

In some embodiments, an intermediate in the synthesis of Compound 1 is

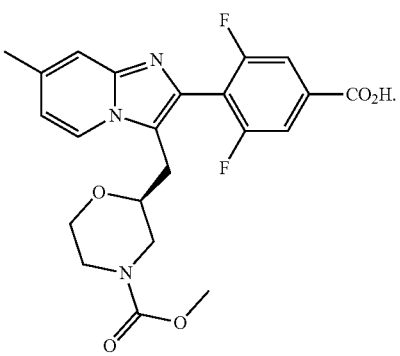 [SMILES: COC(=O)N1CCO[C@@H](Cc2c(-c3c(F)cc(C(=O)O)cc3F)nc3cc(C)ccn23)C1]

Further Forms of Compounds

The compounds described herein may in some cases exist as diastereomers, enantiomers, or other stereoisomeric forms. The compounds presented herein include all diastereomeric, enantiomeric, and epimeric forms as well as the appropriate mixtures thereof. Separation of stereoisomers may be performed by chromatography or by the forming diastereomeric and separation by recrystallization, or chromatography, or any combination thereof. (Jean Jacques, Andre Collet, Samuel H. Wilen, "Enantiomers, Racemates and Resolutions", John Wiley And Sons, Inc., 1981, herein incorporated by reference for this disclosure). Stereoisomers may also be obtained by stereoselective synthesis.

In some situations, compounds may exist as tautomers. All tautomers are included within the formulas described herein.

Pharmaceutically Acceptable Salts

In some embodiments, the compounds described herein exist as their pharmaceutically acceptable salts. In some embodiments, the methods disclosed herein include methods of treating diseases by administering such pharmaceutically acceptable salts. In some embodiments, the methods disclosed herein include methods of treating diseases by administering such pharmaceutically acceptable salts as pharmaceutical compositions.

In some embodiments, the compounds described herein possess acidic or basic groups and therefore react with any of a number of inorganic or organic bases, and inorganic and organic acids, to form a pharmaceutically acceptable salt. In some embodiments, these salts are prepared in situ during the final isolation and purification of the compounds of the invention, or by separately reacting a purified compound in its free form with a suitable acid or base, and isolating the salt thus formed.

In some embodiments, the pharmaceutically acceptable salt of Compound 1 is an acetate, benzoate, besylate, bitartrate, carbonate, citrate, fumarate, gluconate, hydrobromide, hydrochloride, maleate, mesylate, nitrate, phosphate, salicylate, succinate, sulfate, or tartrate salt. In some embodiments, the pharmaceutically acceptable salt of Compound 1 is a mono-hydrochloride salt. In further embodiments, the pharmaceutically acceptable salt of Compound 1 is a mono-hydrochloride salt.

Solvates

In some embodiments, the compounds described herein exist as solvates. The invention provides for methods of treating diseases by administering such solvates. The invention further provides for methods of treating diseases by administering such solvates as pharmaceutical compositions.

Solvates contain either stoichiometric or non-stoichiometric amounts of a solvent, and, in some embodiments, are formed during the process of crystallization with pharmaceutically acceptable solvents such as water, ethanol, and the like. Hydrates are formed when the solvent is water, or alcoholates are formed when the solvent is alcohol. Solvates of the compounds described herein are conveniently prepared or formed during the processes described herein. By way of example only, hydrates of the compounds described herein are conveniently prepared by recrystallization from an aqueous/organic solvent mixture, using organic solvents including, but not limited to, dioxane, tetrahydrofuran or methanol. In addition, the compounds provided herein exist in unsolvated as well as solvated forms. In general, the solvated forms are considered equivalent to the unsolvated forms for the purposes of the compounds and methods provided herein.

Labeled Compounds

In some embodiments, the compounds described herein exist in their isotopically-labeled forms. In some embodiments, the methods disclosed herein include methods of treating diseases by administering such isotopically-labeled compounds. In some embodiments, the methods disclosed herein include methods of treating diseases by administering such isotopically-labeled compounds as pharmaceutical compositions. Thus, in some embodiments, the compounds disclosed herein include isotopically-labeled compounds, which are identical to those recited herein, but for the fact that one or more atoms are replaced by an atom having an atomic mass or mass number different from the atomic mass or mass number usually found in nature. Examples of isotopes that are incorporated into compounds of the invention include isotopes of hydrogen, carbon, nitrogen, oxygen, phosphorous, sulfur, fluorine and chloride, such as $^2H$, $^3H$, $^{13}C$, $^{14}C$, $^{15}N$, $^{18}O$, $^{17}O$, $^{31}P$, $^{32}P$ $^{35}S$, $^{18}F$, and $^{36}Cl$, respectively. Compounds described herein, and pharmaceutically acceptable salts, esters, solvate, hydrates or derivatives thereof which contain the aforementioned isotopes and/or other isotopes of other atoms are within the scope of this invention. Certain isotopically-labeled compounds, for example those into which radioactive isotopes such as $^3H$ and $^{14}C$ are incorporated, are useful in drug and/or substrate tissue distribution assays. Tritiated, i. e., $^3H$ and carbon-14, i. e., $^{14}C$, isotopes are particularly preferred for their ease of preparation and detectability. Further, substitution with heavy isotopes such as deuterium, i.e., $^2H$, produces certain therapeutic advantages resulting from greater metabolic stability, for example increased in vivo half-life or reduced dosage requirements. Increased levels of deuterium incorporation produce a detectable kinetic isotope effect (KIE) that may affect the pharmacokinetic, pharmacologic and/or toxicologic parameters of Compound 1 in comparison to Compound 1 having naturally occurring levels of deuterium. In some embodiments, the isotopically labeled compound, or a pharmaceutically acceptable salt thereof, is prepared by any suitable method.

In some embodiments, at least one hydrogen in Compound 1 is replaced with deuterium.

In some embodiments, the compounds described herein are labeled by other means, including, but not limited to, the use of chromophores or fluorescent moieties, bioluminescent labels, or chemiluminescent labels.

Process for Preparation

In some embodiments, the synthesis of compounds described herein are accomplished using means described in the chemical literature, using the methods described herein, or by a combination thereof. In addition, solvents, temperatures and other reaction conditions presented herein may vary.

In other embodiments, the starting materials and reagents used for the synthesis of the compounds described herein are synthesized or are obtained from commercial sources, such as, but not limited to, Sigma-Aldrich, FischerScientific (Fischer Chemicals), and AcrosOrganics. In further embodiments, the compounds described herein, and other related compounds having different substituents are synthesized using techniques and materials described herein as well as those that are recognized in the field, such as described, for example, in Fieser and Fieser's Reagents for Organic Synthesis, Volumes 1-17 (John Wiley and Sons, 1991); Rodd's Chemistry of Carbon Compounds, Volumes 1-5 and Supplementals (Elsevier Science Publishers, 1989); Organic Reactions, Volumes 1-40 (John Wiley and Sons, 1991), Larock's Comprehensive Organic Transformations (VCH Publishers Inc., 1989), March, Advanced Organic Chemistry 4$^{th}$ Ed., (Wiley 1992); Carey and Sundberg, Advanced Organic Chemistry 4$^{th}$ Ed., Vols. A and B (Plenum 2000, 2001), and Green and Wuts, Protective Groups in Organic Synthesis 3$^{rd}$ Ed., (Wiley 1999) (all of which are incorporated by reference for such disclosure). General methods for the preparation of compounds as disclosed herein may be derived from reactions and the reactions may be modified by the use of appropriate reagents and conditions, for the introduction of the various moieties found in the formulae as provided herein.

In some embodiments is a process for the preparation of methyl (S)-2-((2-(2,6-difluoro-4-(methylcarbamoyl)phenyl)-7-methylimidazo[1,2-a]pyridin-3-yl)methyl)morpholine-4-carboxylate (Compound 1):

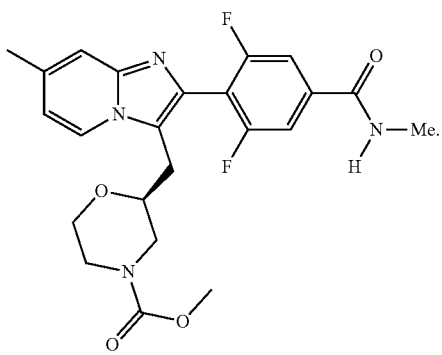 [SMILES: CNC(=O)c1cc(F)c(-c2nc3cc(C)ccn3c2C[C@H]2CN(C(=O)OC)CCO2)c(F)c1]

comprising contacting a compound with the structure:

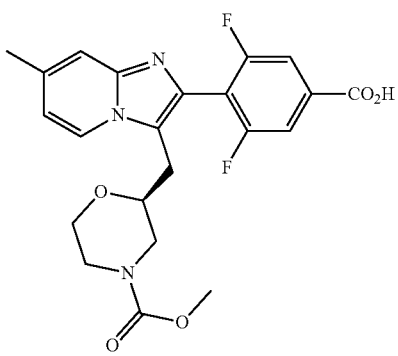 [SMILES: COC(=O)N1CCO[C@@H](Cc2c(-c3c(F)cc(C(=O)O)cc3F)nc3cc(C)ccn23)C1]

with an amide coupling reagent and methylamine, or a salt thereof. In some embodiments, the amide coupling reagent is carbonyldiimidazole. In some embodiments, the amide coupling reagent is propanephosphonic acid anhydride (T3P). In some embodiments, the amide coupling reagent is a carbodiimide coupling agent. In some embodiments, the amide coupling reagent is 1-ethyl-3-(3-dimethylaminopropyl)carbodiimide. In some embodiments, the amide coupling reagent is 1-ethyl-3-(3-dimethylaminopropyl)carbodiimide with added N-hydroxybenzotriazole.

In some embodiments of a process for the preparation of methyl (S)-2-((2-(2,6-difluoro-4-(methylcarbamoyl)phenyl)-7-methylimidazo[1,2-a]pyridin-3-yl)methyl)morpholine-4-carboxylate (Compound 1), the compound with the structure:

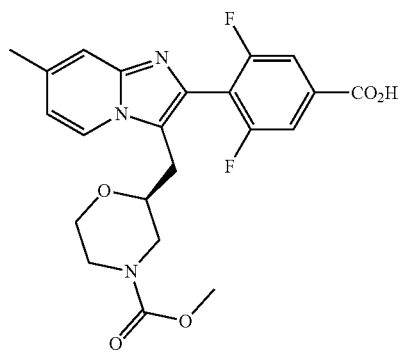 [SMILES: COC(=O)N1CCO[C@@H](Cc2c(-c3c(F)cc(C(=O)O)cc3F)nc3cc(C)ccn23)C1]

is prepared by a process comprising contacting a compound with the structure:

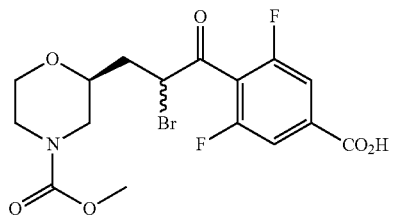 [SMILES: COC(=O)N1CCO[C@@H](CC(Br)C(=O)c2c(F)cc(C(=O)O)cc2F)C1]

with 2-amino-4-methylpyridine. In some embodiments, the process comprises contacting a compound with the structure:

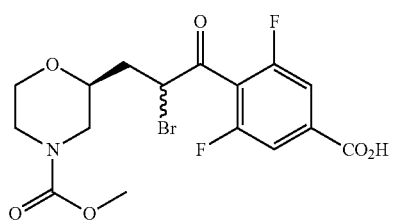 [SMILES: COC(=O)N1CCO[C@@H](CC(Br)C(=O)c2c(F)cc(C(=O)O)cc2F)C1]

with 2-amino-4-methylpyridine and sodium borohydride. In some embodiments, the process comprises contacting a compound with the structure:

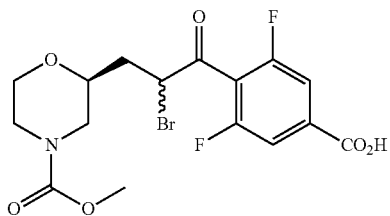 [SMILES: COC(=O)N1CCO[C@@H](CC(Br)C(=O)c2c(F)cc(C(=O)O)cc2F)C1]

with 2-amino-4-methylpyridine in the presence of a solvent. In some embodiments, the solvent is acetonitrile.

In some embodiments of a process for the preparation of methyl (S)-2-((2-(2,6-difluoro-4-(methylcarbamoyl)phenyl)-7-methylimidazo[1,2-a]pyridin-3-yl)methyl)morpholine-4-carboxylate (Compound 1), the compound with the structure:

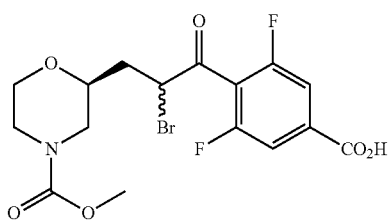 [SMILES: COC(=O)N1CCO[C@@H](CC(Br)C(=O)c2c(F)cc(C(=O)O)cc2F)C1]

is prepared by a process comprising contacting a compound with the structure:

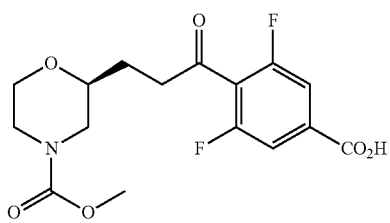 [SMILES: COC(=O)N1CCO[C@@H](CCC(=O)c2c(F)cc(C(=O)O)cc2F)C1]

with a brominating agent. In some embodiments, the brominating agent is N-bromosuccinimide. In some embodiments, the brominating agent is copper(II) bromide. In some embodiments, the brominating agent is liquid bromine.

In some embodiments of a process for the preparation of methyl (S)-2-((2-(2,6-difluoro-4-(methylcarbamoyl)phenyl)-7-methylimidazo[1,2-a]pyridin-3-yl)methyl)morpholine-4-carboxylate (Compound 1), the compound with the structure:

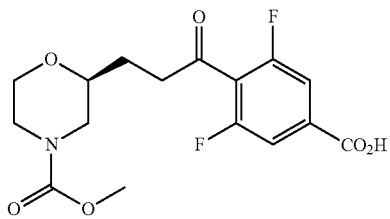 [SMILES: COC(=O)N1CCO[C@@H](CCC(=O)c2c(F)cc(C(=O)O)cc2F)C1]

is prepared by a process comprising contacting a compound with the structure:

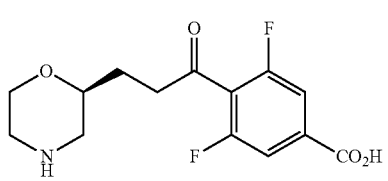 [SMILES: O=C(O)c1cc(F)c(C(=O)CC[C@H]2CNCCO2)c(F)c1]

with methyl chloroformate and a base. In some embodiments, the base is sodium bicarbonate.

In some embodiments of a process for the preparation of methyl (S)-2-((2-(2,6-difluoro-4-(methylcarbamoyl)phenyl)-7-methylimidazo[1,2-a]pyridin-3-yl)methyl)morpholine-4-carboxylate (Compound 1), the compound with the structure:

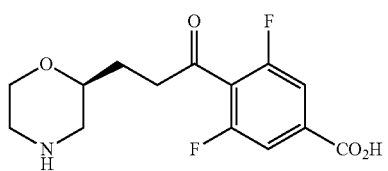 [SMILES: O=C(O)c1cc(F)c(C(=O)CC[C@H]2CNCCO2)c(F)c1]

is prepared by a process comprising contacting a compound with the structure:

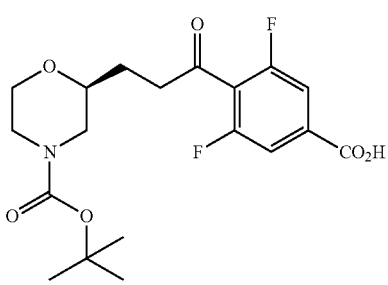 [SMILES: CC(C)(C)OC(=O)N1CCO[C@@H](CCC(=O)c2c(F)cc(C(=O)O)cc2F)C1]

with hydrogen chloride in the presence of a solvent. In some embodiments, the solvent is ethyl acetate.

In some embodiments of a process for the preparation of methyl (S)-2-((2-(2,6-difluoro-4-(methylcarbamoyl)phenyl)-7-methylimidazo[1,2-a]pyridin-3-yl)methyl)morpholine-4-carboxylate (Compound 1), the compound with the structure:

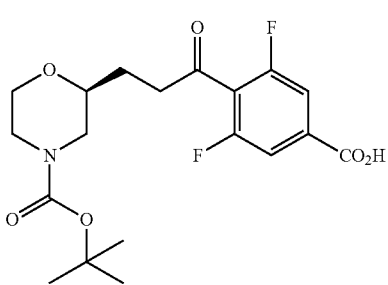 [SMILES: CC(C)(C)OC(=O)N1CCO[C@@H](CCC(=O)c2c(F)cc(C(=O)O)cc2F)C1]

is prepared by a process comprising contacting a compound with the structure:

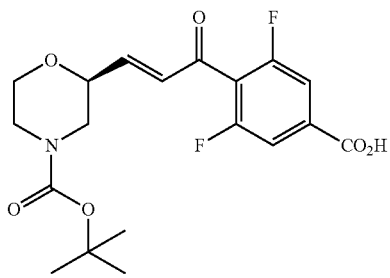 [SMILES: CC(C)(C)OC(=O)N1CCO[C@@H](/C=C/C(=O)c2c(F)cc(C(=O)O)cc2F)C1]

with a hydrogenation catalyst and hydrogen. In some embodiments, the hydrogenation catalyst is palladium on carbon, palladium hydroxide, rhodium on carbon, rhodium on alumina, platinum oxide, or platinum on carbon. In some embodiments, the hydrogenation catalyst is palladium on carbon.

In some embodiments of a process for the preparation of methyl (S)-2-((2-(2,6-difluoro-4-(methylcarbamoyl)phenyl)-7-methylimidazo[1,2-a]pyridin-3-yl)methyl)morpholine-4-carboxylate (Compound 1), the compound with the structure:

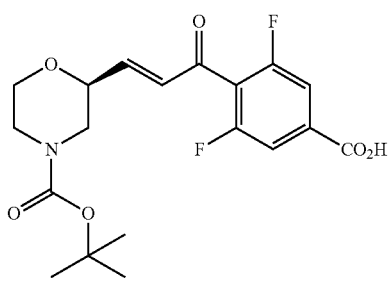 [SMILES: CC(C)(C)OC(=O)N1CCO[C@@H](/C=C/C(=O)c2c(F)cc(C(=O)O)cc2F)C1]

is prepared by a process comprising contacting a compound with the structure:

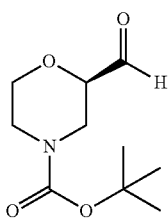

and a compound with the structure

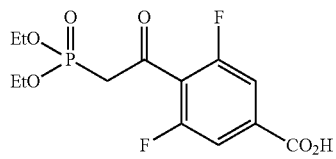 [SMILES: CCOP(=O)(CC(=O)c1c(F)cc(C(=O)O)cc1F)OCC]

with a base. In some embodiments, the base is a mixture of potassium bicarbonate and potassium carbonate.

In some embodiments of a process for the preparation of methyl (S)-2-((2-(2,6-difluoro-4-(methylcarbamoyl)phenyl)-7-methylimidazo[1,2-a]pyridin-3-yl)methyl)morpholine-4-carboxylate (Compound 1), the compound with the structure:

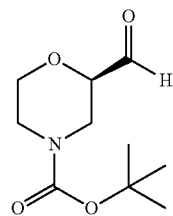

is prepared by a process comprising contacting a compound with the structure:

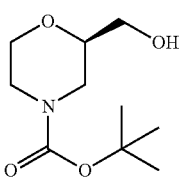

with 2,2,6,6-tetramethylpiperidine 1-oxyl or T3P.

Further disclosed herein, is a process for the preparation of methyl (S)-2-((2-(2,6-difluoro-4-(methylcarbamoyl)phenyl)-7-methylimidazo[1,2-a]pyridin-3-yl)methyl)morpholine-4-carboxylate (Compound 1), comprising:

A) the reaction of a compound with the structure:

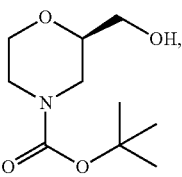

with 2,2,6,6-tetramethylpiperidine 1-oxyl or T3P to produce a compound with the structure:

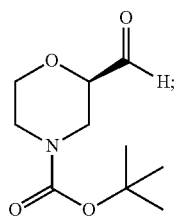

B) followed by the reaction of the compound with the structure:

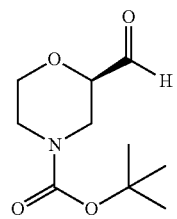

with a compound with the structure:

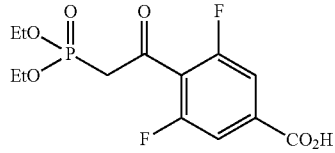

and a mixture of potassium bicarbonate and potassium carbonate to produce a compound with the structure:

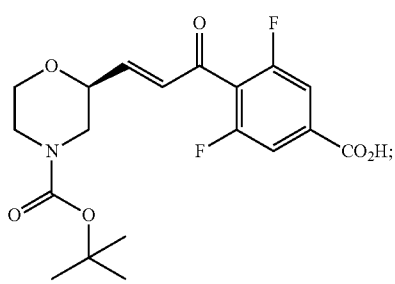 [SMILES: CC(C)(C)OC(=O)N1CCO[C@@H](/C=C/C(=O)c2c(F)cc(C(=O)O)cc2F)C1]

C) followed by the reaction of the compound with the structure:

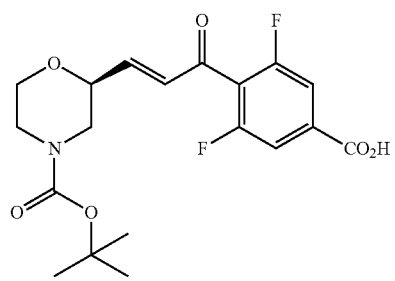 [SMILES: CC(C)(C)OC(=O)N1CCO[C@@H](/C=C/C(=O)c2c(F)cc(C(=O)O)cc2F)C1]

with palladium on carbon and hydrogen to produce a compound with the structure:

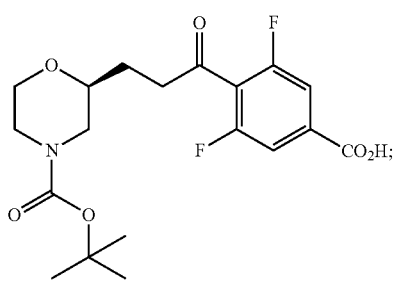 [SMILES: CC(C)(C)OC(=O)N1CCO[C@@H](CCC(=O)c2c(F)cc(C(=O)O)cc2F)C1]

D) followed by the reaction of the compound with the structure:

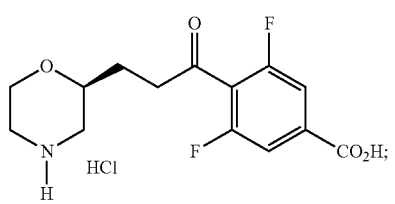 [SMILES: O=C(O)c1cc(F)c(C(=O)CC[C@H]2CNCCO2)c(F)c1 ; Cl]

with hydrogen chloride in ethyl acetate to produce a compound with the structure;

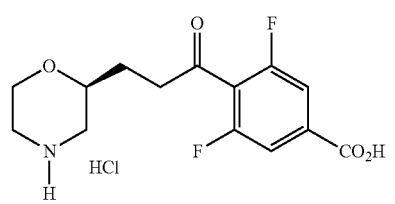 [SMILES: O=C(O)c1cc(F)c(C(=O)CC[C@H]2CNCCO2)c(F)c1 ; Cl]

E) followed by the reaction of the compound with the structure:

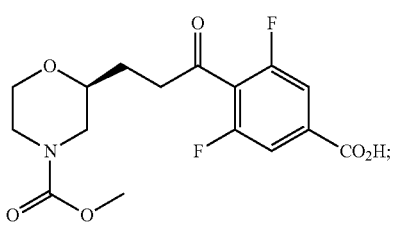 [SMILES: COC(=O)N1CCO[C@@H](CCC(=O)c2c(F)cc(C(=O)O)cc2F)C1]

with methyl chloroformate and sodium bicarbonate to produce a compound with the structure:

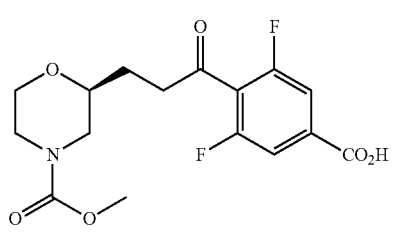 [SMILES: COC(=O)N1CCO[C@@H](CCC(=O)c2c(F)cc(C(=O)O)cc2F)C1]

F) followed by the reaction of the compound with the structure:

with N-bromosuccinimide and an acid to produce a compound with the structure:

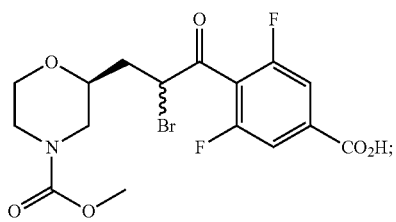 [SMILES: COC(=O)N1CCO[C@@H](CC(Br)C(=O)c2c(F)cc(C(=O)O)cc2F)C1]

G) followed by the reaction of the compound with the structure:

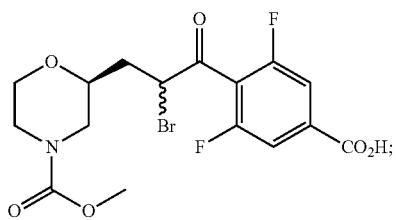 [SMILES: COC(=O)N1CCO[C@@H](CC(Br)C(=O)c2c(F)cc(C(=O)O)cc2F)C1]

with 2-amino-4-methylpyridine and optionally sodium borohydride to produce a compound with the structure:

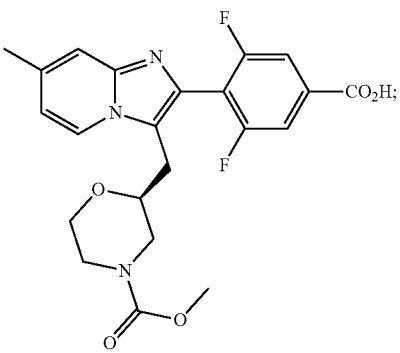 [SMILES: COC(=O)N1CCO[C@@H](Cc2c(-c3c(F)cc(C(=O)O)cc3F)nc3cc(C)ccn23)C1]

H) followed by the reaction of the compound with the structure:

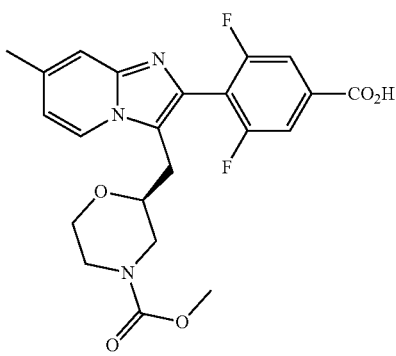 [SMILES: COC(=O)N1CCO[C@@H](Cc2c(-c3c(F)cc(C(=O)O)cc3F)nc3cc(C)ccn23)C1]

with carbonyldiimidazole and methylamine to produce a compound with the structure:

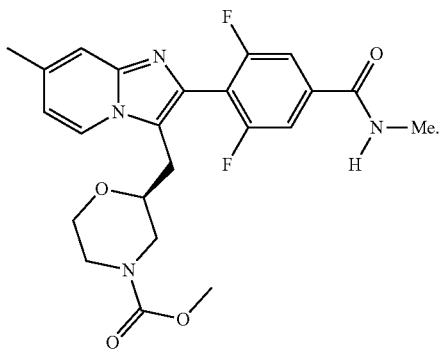 [SMILES: CNC(=O)c1cc(F)c(-c2nc3cc(C)ccn3c2C[C@H]2CN(C(=O)OC)CCO2)c(F)c1]

In some embodiments of a process for the preparation of methyl (S)-2-((2-(2,6-difluoro-4-(methylcarbamoyl)phenyl)-7-methylimidazo[1,2-a]pyridin-3-yl)methyl)morpholine-4-carboxylate (Compound 1), the compound with the structure:

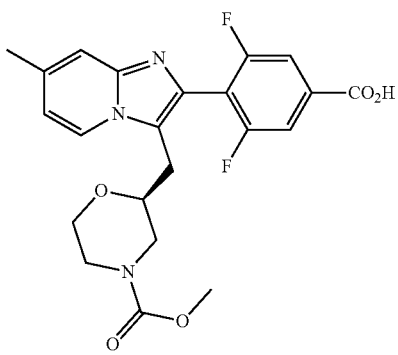 [SMILES: COC(=O)N1CCO[C@@H](Cc2c(-c3c(F)cc(C(=O)O)cc3F)nc3cc(C)ccn23)C1]

is prepared by a process comprising contacting a compound with the structure:

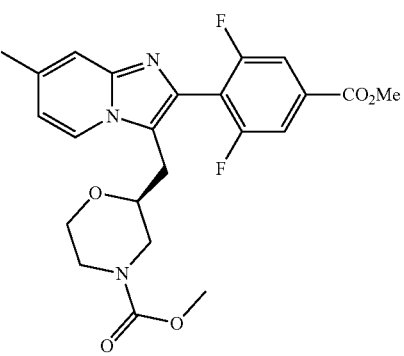 [SMILES: COC(=O)c1cc(F)c(-c2nc3cc(C)ccn3c2C[C@H]2CN(C(=O)OC)CCO2)c(F)c1]

with base and optionally sodium borohydride in the presence of a solvent. In some embodiments, the process comprises contacting a compound with the structure:

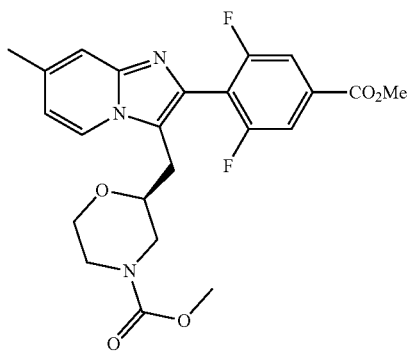 [SMILES: COC(=O)c1cc(F)c(-c2nc3cc(C)ccn3c2C[C@H]2CN(C(=O)OC)CCO2)c(F)c1]

with base and sodium borohydride in the presence of a solvent. In some embodiments, the process comprises contacting a compound with the structure:

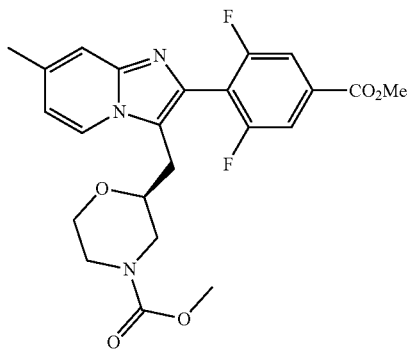 [SMILES: COC(=O)c1cc(F)c(-c2nc3cc(C)ccn3c2C[C@H]2CN(C(=O)OC)CCO2)c(F)c1]

with base and no sodium borohydride in the presence of a solvent. In some embodiments, the solvent is aqueous tetrahydrofuran, dioxane, 2-methyl tetrahydrofuran, aqueous methanol, aqueous ethanol, or aqueous acetonitrile. In some embodiments, the solvent is aqueous tetrahydrofuran. In some embodiments, the base is lithium hydroxide. In some embodiments, the base is sodium hydroxide. In some embodiments, the base is potassium hydroxide.

In some embodiments of a process for the preparation of methyl (S)-2-((2-(2,6-difluoro-4-(methylcarbamoyl)phenyl)-7-methylimidazo[1,2-a]pyridin-3-yl)methyl)morpholine-4-carboxylate (Compound 1), the compound with the structure:

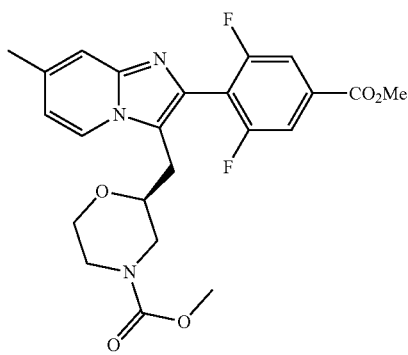 [SMILES: COC(=O)c1cc(F)c(-c2nc3cc(C)ccn3c2C[C@H]2CN(C(=O)OC)CCO2)c(F)c1]

is prepared by a process comprising contacting a compound with the structure:

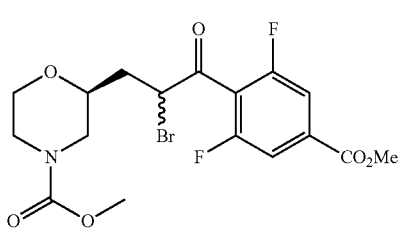 [SMILES: COC(=O)c1cc(F)c(C(=O)C(Br)C[C@H]2CN(C(=O)OC)CCO2)c(F)c1]

with 2-amino-4-methylpyridine.

In some embodiments of a process for the preparation of methyl (S)-2-((2-(2,6-difluoro-4-(methylcarbamoyl)phenyl)-7-methylimidazo[1,2-a]pyridin-3-yl)methyl)morpholine-4-carboxylate (Compound 1), the compound with the structure:

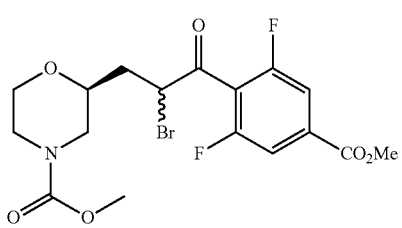 [SMILES: COC(=O)c1cc(F)c(C(=O)C(Br)C[C@H]2CN(C(=O)OC)CCO2)c(F)c1]

is prepared by a process comprising contacting a compound with the structure:

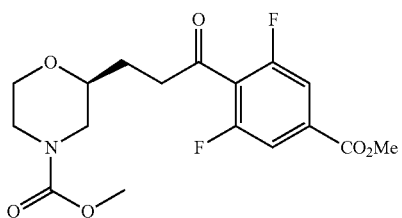 [SMILES: COC(=O)c1cc(F)c(C(=O)CC[C@H]2CN(C(=O)OC)CCO2)c(F)c1]

with a brominating agent. In some embodiments, the brominating agent is copper(II) bromide. In some embodiments, the brominating agent is liquid bromine.

In some embodiments of a process for the preparation of methyl (S)-2-((2-(2,6-difluoro-4-(methylcarbamoyl)phenyl)-7-methylimidazo[1,2-a]pyridin-3-yl)methyl)morpholine-4-carboxylate (Compound 1), the compound with the structure:

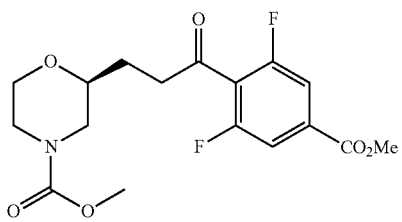 [SMILES: COC(=O)c1cc(F)c(C(=O)CC[C@H]2CN(C(=O)OC)CCO2)c(F)c1]

is prepared by a process comprising contacting a compound with the structure:

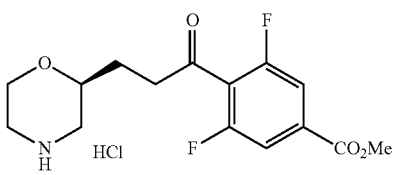 [SMILES: COC(=O)c1cc(F)c(C(=O)CC[C@H]2CNCCO2)c(F)c1 ; Cl]

with methyl chloroformate and a base. In some embodiments, the base is sodium bicarbonate.

In some embodiments of a process for the preparation of methyl (S)-2-((2-(2,6-difluoro-4-(methylcarbamoyl)phenyl)-7-methylimidazo[1,2-a]pyridin-3-yl)methyl)morpholine-4-carboxylate (Compound 1), the compound with the structure:

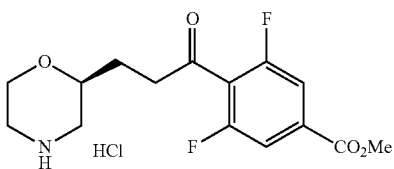 [SMILES: COC(=O)c1cc(F)c(C(=O)CC[C@H]2CNCCO2)c(F)c1 ; Cl]

is prepared by a process comprising contacting a compound with the structure:

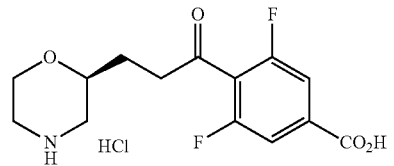 [SMILES: O=C(O)c1cc(F)c(C(=O)CC[C@H]2CNCCO2)c(F)c1 ; Cl]

with hydrogen chloride and methanol.

In some embodiments of a process for the preparation of methyl (S)-2-((2-(2,6-difluoro-4-(methylcarbamoyl)phenyl)-7-methylimidazo[1,2-a]pyridin-3-yl)methyl)morpholine-4-carboxylate (Compound 1), the compound with the structure:

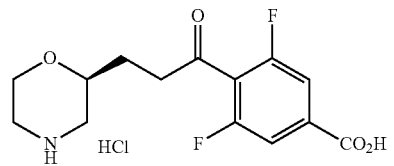 [SMILES: O=C(O)c1cc(F)c(C(=O)CC[C@H]2CNCCO2)c(F)c1 ; Cl]

is prepared by a process comprising contacting a compound with the structure:

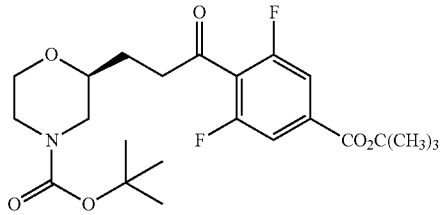

with hydrogen chloride and ethyl acetate.

In some embodiments of a process for the preparation of methyl (S)-2-((2-(2,6-difluoro-4-(methylcarbamoyl)phenyl)-7-methylimidazo[1,2-a]pyridin-3-yl)methyl)morpholine-4-carboxylate (Compound 1), the compound with the structure:

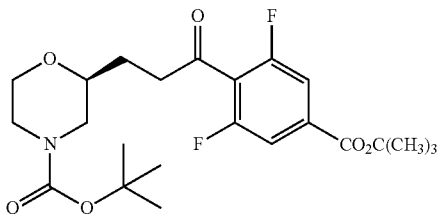

is prepared by a process comprising contacting a compound with the structure:

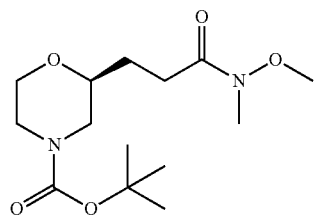 [SMILES: CON(C)C(=O)CC[C@H]1CN(C(=O)OC(C)(C)C)CCO1]

with tert-butyl 3,5-difluorobenzoate and a base. In some embodiments, the base is lithium diisopropylamide.

In some embodiments of a process for the preparation of methyl (S)-2-((2-(2,6-difluoro-4-(methylcarbamoyl)phenyl)-7-methylimidazo[1,2-a]pyridin-3-yl)methyl)morpholine-4-carboxylate (Compound 1), the compound with the structure:

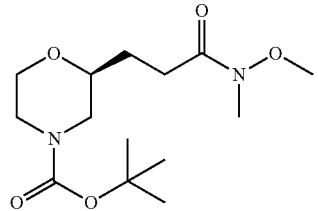 [SMILES: CON(C)C(=O)CC[C@H]1CN(C(=O)OC(C)(C)C)CCO1]

is prepared by a process comprising contacting a compound with the structure:

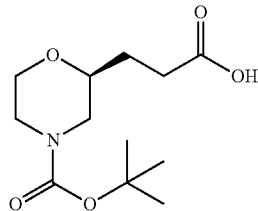 [SMILES: CC(C)(C)OC(=O)N1CCO[C@@H](CCC(=O)O)C1]

with N,O-dimethylhydroxylamine, an amide coupling reagent, and 1-hydroxybenzotriazole. In some embodiments, the amide coupling reagent is 1-ethyl-3-(3-dimethylaminopropyl)carbodiimide.

In some embodiments of a process for the preparation of methyl (S)-2-((2-(2,6-difluoro-4-(methylcarbamoyl)phenyl)-7-methylimidazo[1,2-a]pyridin-3-yl)methyl)morpholine-4-carboxylate (Compound 1), the compound with the structure:

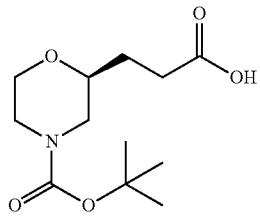 [SMILES: CC(C)(C)OC(=O)N1CCO[C@@H](CCC(=O)O)C1]

is prepared by a process comprising contacting a compound with the structure:

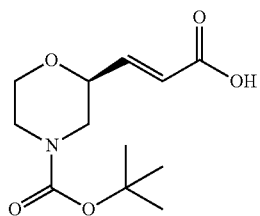

with a hydrogenation catalyst and hydrogen. In some embodiments, the hydrogenation catalyst is palladium on carbon, palladium hydroxide, rhodium on carbon, rhodium on alumina, platinum oxide, or platinum on carbon. In some embodiments, the hydrogenation catalyst is palladium on carbon.

In some embodiments of a process for the preparation of methyl (S)-2-((2-(2,6-difluoro-4-(methylcarbamoyl)phenyl)-7-methylimidazo[1,2-a]pyridin-3-yl)methyl)morpholine-4-carboxylate (Compound 1), the compound with the structure:

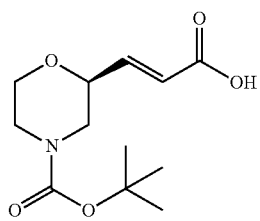

is prepared by a process comprising contacting a compound with the structure:

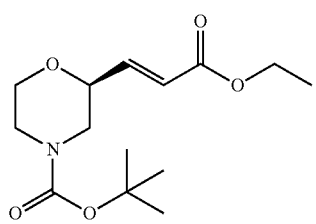 [SMILES: CCOC(=O)/C=C/[C@H]1CN(C(=O)OC(C)(C)C)CCO1]

with a base in aqueous tetrahydrofuran. In some embodiments, the base is sodium hydroxide.

In some embodiments of a process for the preparation of methyl (S)-2-((2-(2,6-difluoro-4-(methylcarbamoyl)phenyl)-7-methylimidazo[1,2-a]pyridin-3-yl)methyl)morpholine-4-carboxylate (Compound 1), the compound with the structure:

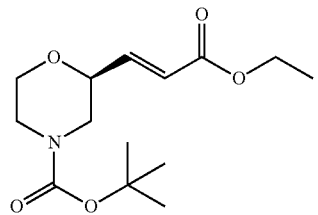 [SMILES: CCOC(=O)/C=C/[C@H]1CN(C(=O)OC(C)(C)C)CCO1]

is prepared by a process comprising contacting a compound with the structure:

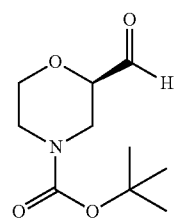

with (carbethoxymethylene)triphenylphosphorane.

In some embodiments of a process for the preparation of methyl (S)-2-((2-(2,6-difluoro-4-(methylcarbamoyl)phenyl)-7-methylimidazo[1,2-a]pyridin-3-yl)methyl)morpholine-4-carboxylate (Compound 1), the compound with the structure:

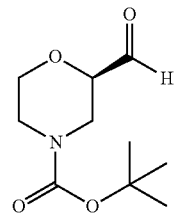

is prepared by a process comprising contacting a compound with the structure:

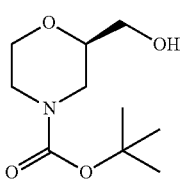

with 2,2,6,6-tetramethylpiperidine 1-oxyl.

Further disclosed herein, is a process for the preparation of methyl (S)-2-((2-(2,6-difluoro-4-(methylcarbamoyl)phenyl)-7-methylimidazo[1,2-a]pyridin-3-yl)methyl)morpholine-4-carboxylate (Compound 1), comprising:

the reaction of a compound with the structure:

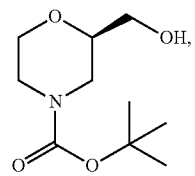

with 2,2,6,6-tetramethylpiperidine 1-oxyl to produce a compound with the structure:

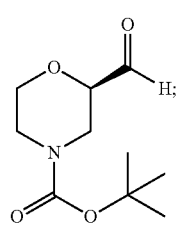

B) followed by the reaction of the compound with the structure:

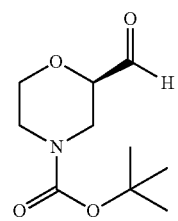

with (carbethoxymethylene)triphenylphosphorane to produce a compound with the structure:

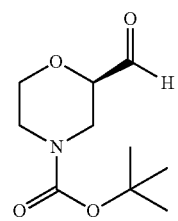

C) followed by the reaction of the compound with the structure:

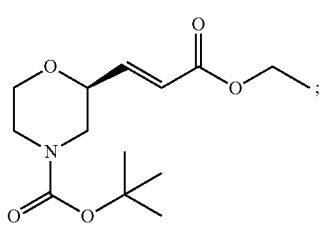 [SMILES: CCOC(=O)/C=C/[C@H]1CN(C(=O)OC(C)(C)C)CCO1]

with sodium hydroxide in aqueous tetrahydrofuran to produce a compound with the structure:

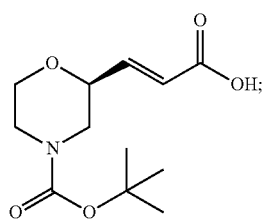

D) followed by the reaction of the compound with the structure:

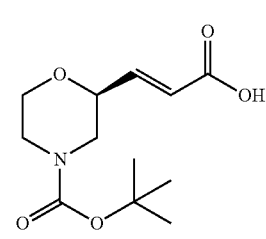 [SMILES: CC(C)(C)OC(=O)N1CCO[C@@H](/C=C/C(=O)O)C1]

with palladium on carbon and hydrogen to produce a compound with the structure;

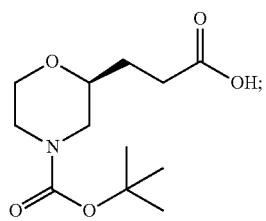 [SMILES: CC(C)(C)OC(=O)N1CCO[C@@H](CCC(=O)O)C1]

E) followed by the reaction of the compound with the structure:

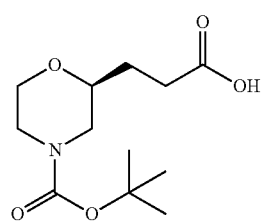 [SMILES: CC(C)(C)OC(=O)N1CCO[C@@H](CCC(=O)O)C1]

with N,O-dimethylhydroxylamine, 1-ethyl-3-(3-dimethylaminopropyl)carbodiimide, and 1-hydroxybenzotriazole to produce a compound with the structure:

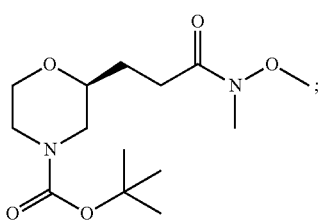 [SMILES: CON(C)C(=O)CC[C@H]1CN(C(=O)OC(C)(C)C)CCO1]

F) followed by the reaction of the compound with the structure:

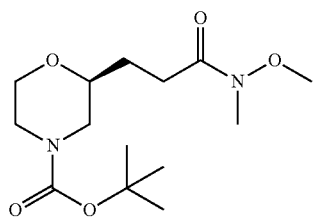 [SMILES: CON(C)C(=O)CC[C@H]1CN(C(=O)OC(C)(C)C)CCO1]

with tert-butyl 3,5-difluorobenzoate and lithium diisopropylamide to produce a compound with the structure:

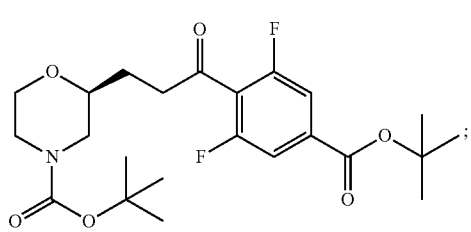 [SMILES: CC(C)(C)OC(=O)c1cc(F)c(C(=O)CC[C@H]2CN(C(=O)OC(C)(C)C)CCO2)c(F)c1]

G) followed by the reaction of the compound with the structure:

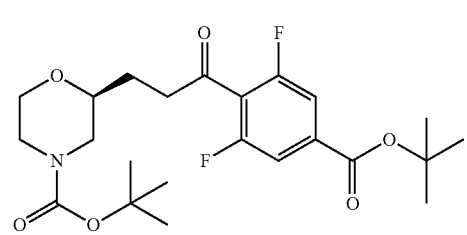 [SMILES: CC(C)(C)OC(=O)c1cc(F)c(C(=O)CC[C@H]2CN(C(=O)OC(C)(C)C)CCO2)c(F)c1]

with hydrogen chloride and ethyl acetate to produce a compound with the structure:

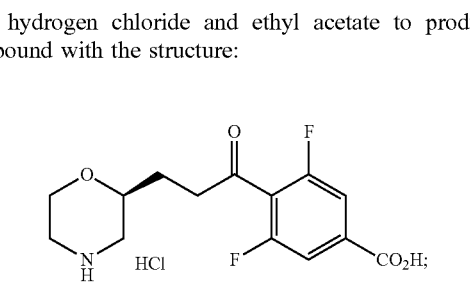

H) followed by the reaction of the compound with the structure:

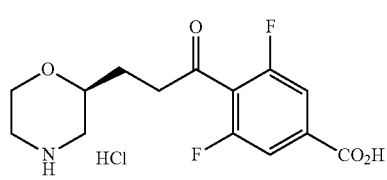 [SMILES: O=C(O)c1cc(F)c(C(=O)CC[C@H]2CNCCO2)c(F)c1 ; Cl]

with hydrogen chloride and methanol to produce a compound with the structure:

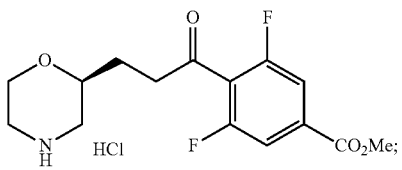 [SMILES: COC(=O)c1cc(F)c(C(=O)CC[C@H]2CNCCO2)c(F)c1 ; Cl]

I) followed by the reaction of the compound with the structure:

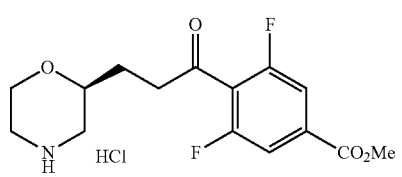 [SMILES: COC(=O)c1cc(F)c(C(=O)CC[C@H]2CNCCO2)c(F)c1 ; Cl]

with methyl chloroformate and sodium bicarbonate to produce a compound with the structure:

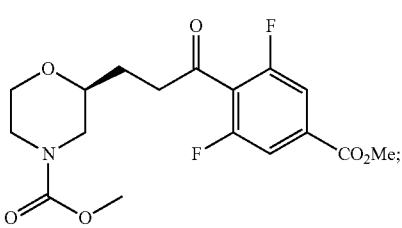 [SMILES: COC(=O)c1cc(F)c(C(=O)CC[C@H]2CN(C(=O)OC)CCO2)c(F)c1]

J) followed by the reaction of the compound with the structure:

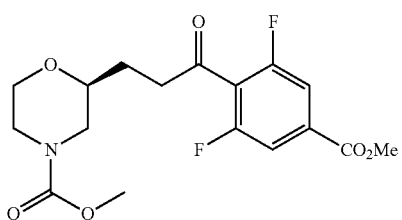 [SMILES: COC(=O)c1cc(F)c(C(=O)CC[C@H]2CN(C(=O)OC)CCO2)c(F)c1]

with copper(II) bromide to produce a compound with the structure:

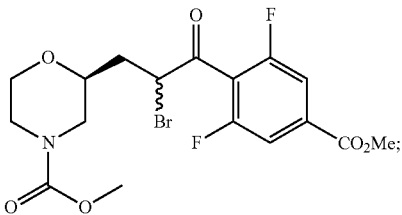 [SMILES: COC(=O)c1cc(F)c(C(=O)C(Br)C[C@H]2CN(C(=O)OC)CCO2)c(F)c1]

K) followed by the reaction of the compound with the structure:

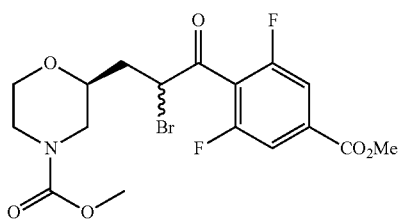

with 2-amino-4-methylpyridine to produce a compound with the structure:

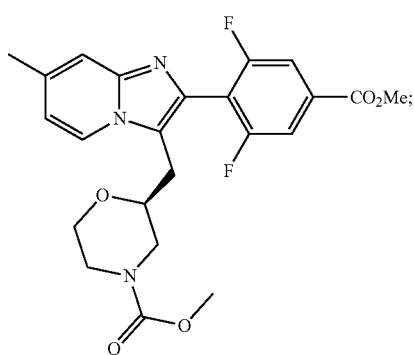 [SMILES: COC(=O)c1cc(F)c(-c2nc3cc(C)ccn3c2C[C@H]2CN(C(=O)OC)CCO2)c(F)c1]

L) followed by the reaction of the compound with the structure:

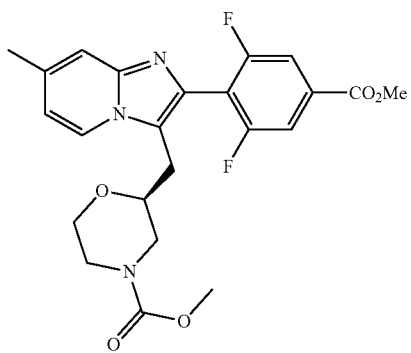 [SMILES: COC(=O)c1cc(F)c(-c2nc3cc(C)ccn3c2C[C@H]2CN(C(=O)OC)CCO2)c(F)c1]

with lithium hydroxide in aqueous tetrahydrofuran and then sodium borohydride to produce a compound with the structure:

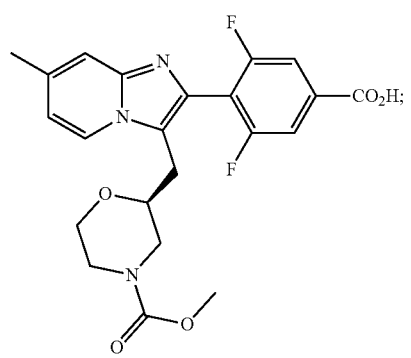 [SMILES: COC(=O)N1CCO[C@@H](Cc2c(-c3c(F)cc(C(=O)O)cc3F)nc3cc(C)ccn23)C1]

M) followed by the reaction of the compound with the structure:

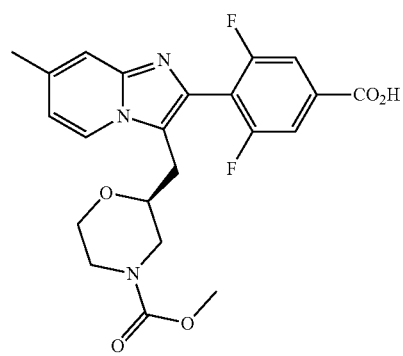 [SMILES: COC(=O)N1CCO[C@@H](Cc2c(-c3c(F)cc(C(=O)O)cc3F)nc3cc(C)ccn23)C1]

with carbonyldiimidazole and methylamine to produce a compound with the structure:

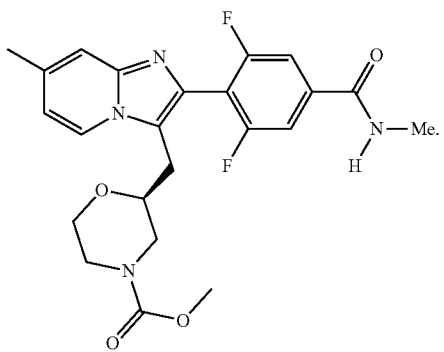 [SMILES: CNC(=O)c1cc(F)c(-c2nc3cc(C)ccn3c2C[C@H]2CN(C(=O)OC)CCO2)c(F)c1]

Pharmaceutical Compositions and Methods of Administration

Administration of P2X3 antagonist as described herein can be in any pharmacological form including a therapeutically effective amount of an P2X3 antagonist alone or in combination with a pharmaceutically acceptable carrier.

Pharmaceutical compositions may be formulated in a conventional manner using one or more physiologically acceptable carriers including excipients and auxiliaries which facilitate processing of the active compounds into preparations which can be used pharmaceutically. Proper formulation is dependent upon the route of administration chosen. Additional details about suitable excipients for pharmaceutical compositions described herein may be found, for example, in Remington: The Science and Practice of Pharmacy, Nineteenth Ed (Easton, Pa.: Mack Publishing Company, 1995); Hoover, John E., Remington's Pharmaceutical Sciences, Mack Publishing Co., Easton, Pennsylvania 1975; Liberman, H. A. and Lachman, L., Eds., Pharmaceutical Dosage Forms, Marcel Decker, New York, N.Y., 1980; and Pharmaceutical Dosage Forms and Drug Delivery Systems, Seventh Ed. (Lippincott Williams & Wilkins1999), herein incorporated by reference for such disclosure.

A pharmaceutical composition, as used herein, refers to a mixture of Compound 1 described herein, with other chemical components, such as carriers, stabilizers, diluents, dispersing agents, suspending agents, thickening agents, and/or excipients. The pharmaceutical composition facilitates administration of the compound to an organism. In practicing the methods of treatment or use provided herein, therapeutically effective amounts of compounds described herein are administered in a pharmaceutical composition to a mammal having a disease, disorder, or condition to be treated. In some embodiments, the mammal is a human. A therapeutically effective amount can vary widely depending on the severity of the disease, the age and relative health of the subject, the potency of the compound used and other factors. Compound 1 can be used singly or in combination with one or more therapeutic agents as components of mixtures (as in combination therapy).

The pharmaceutical formulations described herein can be administered to a subject by multiple administration routes, including but not limited to, oral, parenteral (e.g., intravenous, subcutaneous, intramuscular), intranasal, buccal, topical, rectal, or transdermal administration routes. Moreover, the pharmaceutical compositions described herein, which include Compound 1 described herein, can be formulated into any suitable dosage form, including but not limited to, aqueous oral dispersions, liquids, gels, syrups, elixirs, slurries, suspensions, aerosols, controlled release formulations, fast melt formulations, effervescent formulations, lyophilized formulations, tablets, powders, pills, dragees, capsules, delayed release formulations, extended release formulations, pulsatile release formulations, multiparticulate formulations, and mixed immediate release and controlled release formulations.

In some embodiments, Compound 1 is formulated in a tablet dosage form. In some embodiments, Compound 1 is formulated in a capsule dosage form. In some embodiments, Compound 1 is formulated in a suspension dosage form. In some embodiments, Compound 1 is formulated as powder-in-capsule dosage form. In some embodiments, Compound 1 is formulated as a powder-in-bottle for reconstitution as a suspension.

Pharmaceutical compositions including a compound described herein may be manufactured in a conventional manner, such as, by way of example only, by means of conventional mixing, dissolving, granulating, dragee-making, levigating, emulsifying, encapsulating, entrapping or compression processes.

Dose administration can be repeated depending upon the pharmacokinetic parameters of the dosage formulation and the route of administration used.

It is especially advantageous to formulate compositions in dosage unit form for ease of administration and uniformity of dosage. Dosage unit form as used herein refers to physically discrete units suited as unitary dosages for the mammalian subjects to be treated; each unit containing a predetermined quantity of active compound calculated to produce the desired therapeutic effect in association with the required pharmaceutical carrier. The specification for the dosage unit forms are dictated by and directly dependent on (a) the unique characteristics of Compound 1 and the particular therapeutic effect to be achieved and (b) the limitations inherent in the art of compounding such an active compound for the treatment of sensitivity in individuals. The specific dose can be readily calculated by one of ordinary skill in the art, e.g., according to the approximate body weight or body surface area of the patient or the volume of body space to be occupied. The dose will also be calculated dependent upon the particular route of administration selected. Further refinement of the calculations necessary to determine the appropriate dosage for treatment is routinely made by those of ordinary skill in the art. Exact dosages are determined in conjunction with standard dose-response studies. It will be understood that the amount of the composition actually administered will be determined by a practitioner, in the light of the relevant circumstances including the condition or conditions to be treated, the choice of composition to be administered, the age, weight, and response of the individual patient, the severity of the patient's symptoms, and the chosen route of administration.

Methods of Dosing and Treatment Regimens

The compounds described herein can be used in the preparation of medicaments for the modulation of P2X3, or for the treatment of diseases or conditions that would benefit, at least in part, from modulation of P2X3. In addition, a method for treating any of the diseases or conditions described herein in a subject in need of such treatment, involves administration of pharmaceutical compositions containing at least one compound described herein, or a pharmaceutically acceptable salt, or pharmaceutically acceptable solvate or hydrate thereof, in therapeutically effective amounts to said subject.

The compositions containing the compound(s) described herein can be administered for prophylactic and/or therapeutic treatments. In therapeutic applications, the compositions are administered to a patient already suffering from a disease or condition, in an amount sufficient to cure or at least partially arrest the symptoms of the disease or condition. Amounts effective for this use will depend on the severity and course of the disease or condition, previous therapy, the patient's health status, weight, and response to the drugs, and the judgment of the treating physician.

In prophylactic applications, compositions containing the compounds described herein are administered to a patient susceptible to or otherwise at risk of a particular disease, disorder or condition. Such an amount is defined to be a "prophylactically effective amount or dose." In this use, the precise amounts also depend on the patient's state of health, weight, and the like. When used in a patient, effective amounts for this use will depend on the severity and course of the disease, disorder or condition, previous therapy, the patient's health status and response to the drugs, and the judgment of the treating physician.

In the case wherein the patient's condition does not improve, upon the doctor's discretion the administration of the compounds may be administered chronically, that is, for an extended period of time, including throughout the duration of the patient's life in order to ameliorate or otherwise control or limit the symptoms of the patient's disease or condition.

In the case wherein the patient's status does improve, upon the doctor's discretion the administration of the compounds may be given continuously; alternatively, the dose of drug being administered may be temporarily reduced or temporarily suspended for a certain length of time (i.e., a "drug holiday"). The length of the drug holiday can vary between 2 days and 1 year, including by way of example only, 2 days, 3 days, 4 days, 5 days, 6 days, 7 days, 10 days, 12 days, 15 days, 20 days, 28 days, 35 days, 50 days, 70 days, 100 days, 120 days, 150 days, 180 days, 200 days, 250 days, 280 days, 300 days, 320 days, 350 days, or 365 days. The dose reduction during a drug holiday may be from about 10% to about 100%, including, by way of example only, about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, or about 100%.

Once improvement of the patient's conditions has occurred, a maintenance dose is administered if necessary. Subsequently, the dosage or the frequency of administration, or both, can be reduced, as a function of the symptoms, to a level at which the improved disease, disorder or condition is retained. Patients can, however, require intermittent treatment on a long-term basis upon any recurrence of symptoms.

The amount of a given agent that will correspond to such an amount will vary depending upon factors such as the particular compound, disease or condition and its severity, the identity (e.g., weight) of the subject or host in need of treatment, but can nevertheless be determined in a manner recognized in the field according to the particular circumstances surrounding the case, including, e.g., the specific agent being administered, the route of administration, the condition being treated, and the subject or host being treated. In general, however, doses employed for adult human treatment will typically be in the range of about 0.01 mg per day to about 5000 mg per day, in some embodiments, about 1 mg per day to about 1500 mg per day. The desired dose may conveniently be presented in a single dose or as divided doses administered simultaneously (or over a short period of time) or at appropriate intervals, for example as two, three, four or more sub-doses per day.

The pharmaceutical composition described herein may be in unit dosage forms suitable for single administration of precise dosages. In unit dosage form, the formulation is divided into unit doses containing appropriate quantities of one or more compound. The unit dosage may be in the form of a package containing discrete quantities of the formulation. Non-limiting examples are packaged tablets or capsules, and powders in vials, capsules, bottles, or ampoules. Aqueous suspension compositions can be packaged in single-dose non-reclosable containers. Alternatively, multiple-dose reclosable containers can be used, in which case it is typical to include a preservative in the composition. By way of example only, formulations for parenteral injection may be presented in unit dosage form, which include, but are not limited to ampoules, or in multi-dose containers, with an added preservative.

EXAMPLES

All chemicals, reagents, and solvents were purchased from commercial sources when available and used without further purification.

Example 1: Synthesis of methyl (S)-2-(3-(2,6-difluoro-4-(methoxycarbonyl)phenyl)-3-oxopropyl)morpholine-4-carboxylate (compound J)

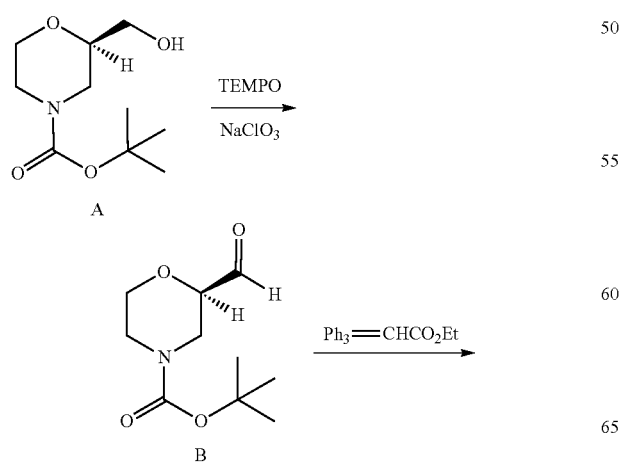

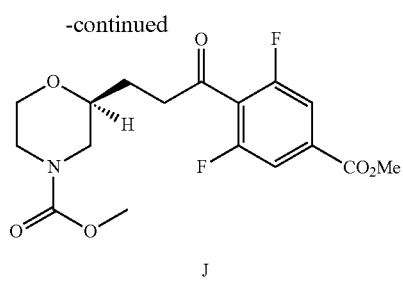

J

Step 1: The hydroxymethyl group of A (106 kg, 487.9 mole) was oxidized to the corresponding aldehyde B at a temperature of −3° C. to 1.5° C. under biphasic conditions (dichloromethane-water) by reaction with sodium bromide, sodium bicarbonate, catalytic TEMPO (2,2,6,6,-tetramethyl-1-piperidinyloxy, free radical) and sodium hypochlorite (added dropwise over ~10 h while maintaining a temperature of −3° C. to 1.5° C.). After stirring an additional 2 h, the reaction was quenched at −5° C. to 0° C. using sodium thiosulfate and stirred for 30 minutes.

Step 2: The biphasic system from above containing aldehyde B was treated in portions at 5° C. to 10° C. with commercially available (carbethoxymethylene)triphenylphosphorane. After stirring for 1 h at 8° C. to 15° C., water was added, the mixture was stirred for 30 minutes, the layers were separated, and the aqueous layer was extracted with additional dichloromethane. The combined organic layers containing unsaturated ester C were washed with brine and concentrated to remove most of the dichloromethane. A mixture of petroleum ether/THF was added the resulting mixture was stirred for 1 h at 20° C. The mixture was then filtered to remove triphenylphosphine oxide and the filter cake was washed with additional petroleum ether/THF. The filtrate containing C was concentrated and THF was added. The mixture was concentrated again and fresh THF was added. This solution of C was used "as is" in the following step. The assay yield of C was 58.2 kg.

Step 3: The solution of C in THF was treated dropwise with a solution of 3M NaOH over 2 hours at 15° C. to 25° C. The mixture was then warmed to 25° C. to 35° C. and stirred for 8 hours. The mixture was cooled to 20° C. to 25° C., MTBE was added, and the layers were separated. The organic layer was extracted with water and, while maintaining the temperature at below 15° C., the combined aqueous layers containing the sodium salt of D were acidified slowly with 3N HCl until the pH was 10-11. The aqueous mixture was then washed with dichloromethane to remove any residual triphenylphosphine oxide and then slowly acidified to pH 5 using 3N HCl while maintaining a temperature below 15° C. The resulting mixture was extracted with dichloromethane and the organic extracts containing D were concentrated. THF was then added and evaporated. The crude product D was dissolved in THF and used directly in the following step.

Step 4: The solution of D in THF (43.7 kg by assay) was charged to a hydrogenation reactor. A THF slurry of Pd/C (2.90 kg) was added, and the resulting mixture was stirred under hydrogen (~145 psi) at 25° C. to 49° C. for 12 h. The mixture was filtered under nitrogen, the filter cake was washed with THF and the filtrate was concentrated. Dichloromethane was added and concentrated to remove THF and the operation was repeated. Fresh dichloromethane was added to the mixture and the resulting solution of E (43.5 kg based on assay) was used directly in the following step.

Step 5: A solution of E in dichloromethane at 10° C. to 15° C. was treated with N-hydroxybenzotriazole (HOBT), N,O-dimethylhydroxylamine hydrochloride, and triethylamine. 1-(3-dimethylaminopropyl)-3-ethylcarbodiimide hydrochloride (EDCI) was then added in portions. The mixture was stirred at 15° C. to 25° C. for 12 h. Water was added, the resulting mixture was stirred for 12 h, and the layers were separated. The aqueous layer was separated and extracted with fresh dichloromethane. The combined organic layers were washed with sodium bicarbonate solution to remove HOBT and dried. The dichloromethane was concentrated, n-heptane was added, and the mixture was concentrated to remove the dichloromethane. Fresh n-heptane was added and the mixture was stirred at 15° C. for 10 h. The solid was filtered and dried to afford 38.6 kg of F.

Step 6: A solution of 3,5-difluorobenzoic acid, tert-butyl ester in THF was cooled to −65° C. under nitrogen and treated dropwise with 1.5 equivalents of LDA solution. The mixture was stirred at −60° to −65° C. for 1 h and then treated dropwise with a solution of compound F (37 kg) in THF. The reaction was stirred between −65° C. and −60° C. for 6 h and then quenched at −65° C. with a solution of acetic acid in THF. The temperature was raised to −33° C. and the mixture was stirred for 30 minutes. Ethyl acetate was added and the mixture was diluted with brine. The layers were separated and the organic layer was washed with brine and then concentrated to generate a solution of compound G in ethyl acetate which was used directly in the next step.

Step 7: HCl gas (60.4 kg) was bubbled into ethyl acetate (360 kg) between −6° C. and 0° C. Compound G was added to the mixture over 2 h at a temperature of 20° C. to 25° C. The reaction was then stirred for 16 h, filtered, and the product was washed with ethyl acetate and MTBE and dried under vacuum to afford H.

Step 8: Methanol was charged into a reactor at 26° C., and cooled to −7° C. HCl was then bubbled into the methanol at −7° C. to 0° C. over 8 h. Compound H (28.8 kg) was added at 2° C. and the mixture was heated to 40° C. to 50° C. and then stirred for 6 h. The reaction was then concentrated and the residual dichloromethane solvent was swapped initially to heptane (addition of heptane followed by concentration) and then to THF (addition of THF followed by concentration). The resulting solution of compound I was used directly in the next step.

Step 9: A solution of compound I (~24.6 kg) in THF was diluted with water, the mixture was cooled to −5° C. to 0° C., and the pH was adjusted to 7-8 using sodium bicarbonate solution (2.5 equiv bicarbonate). An additional 2 equivalents of sodium bicarbonate were added and methyl chloroformate (1.2 equivalents) was added dropwise over 1.5 h and the reaction was stirred at −5° C. to 0° C. for 1.5 h. Water, ethyl acetate, and 2N HCl were added, the layers were separated, and the organic layer was washed with brine and then concentrated. Additional ethyl acetate was added and evaporated to generate an ethyl acetate solution of J. Heptane (4 volumes) was added while stirring at 55° C., the mixture was cooled to 10° C. and stirred for 6 h. The product was filtered, washed with ethyl acetate:heptane (1:4), and dried to give J (20.6 kg).

The product was further purified by dissolving J (20.6 kg) in ethyl acetate at 28° C. and filtering through a pad of silica gel (25 kg). The filtrate was concentrated at 40° C. to 50° C. to ~50 liters and 50 kg of ethyl acetate:heptane (1:3) was added at 55° C. After stirring for 1 h, the mixture was cooled to 10° C. and stirred for 6 h. The product was filtered and washed with ethyl acetate:heptane (1:3) and dried to afford J (18.5 kg).

Synthesis of 3,5-difluorobenzoic acid, Tert-Butyl Ester

A solution of 3,5-difluorobenzoic acid (75 kg) in tert-butanol was treated with DMAP (5.8 kg) and triethylamine (67.2 kg) and cooled to 5° C. Di-tert-butyldicarbonate (124 kg, 1.2 equivalents) was added in portions over 3 h, and the mixture was then stirred at 20° C. to 25° C. for 12 h. The mixture was diluted with MTBE and water, and stirred for 30 minutes. The organic layer was cooled to 0° C., acidified with 1.5M HCl (470 kg), and the mixture was stirred for 30 minutes. The organic layer was then washed with brine, concentrated to ~150 L, and then THF (90 kg) was added and the mixture was concentrated. This procedure was repeated (90 kg THF added and evaporated) and the resulting solution of 3,5-difluorobenzoic acid, tert-butyl ester in THF was used directly in Step 6 (above) to prepare compound G.

Example 2: Synthesis of methyl (S)-2-((2-(2,6-difluoro-4-(methylcarbamoyl)phenyl)-7-methylimidazo[1,2-a]pyridin-3-yl)methyl)morpholine-4-carboxylate (Compound 1)

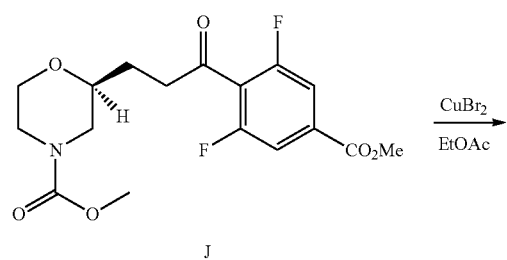

J

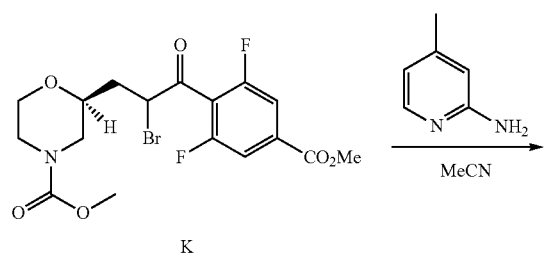

K

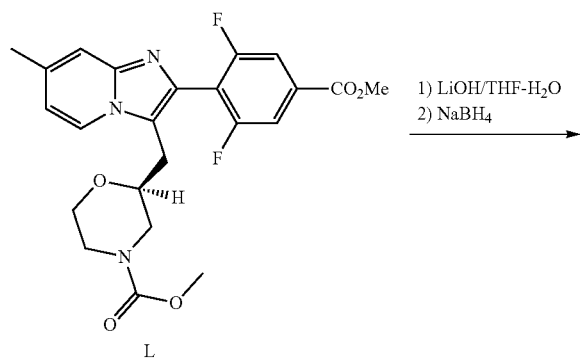

L

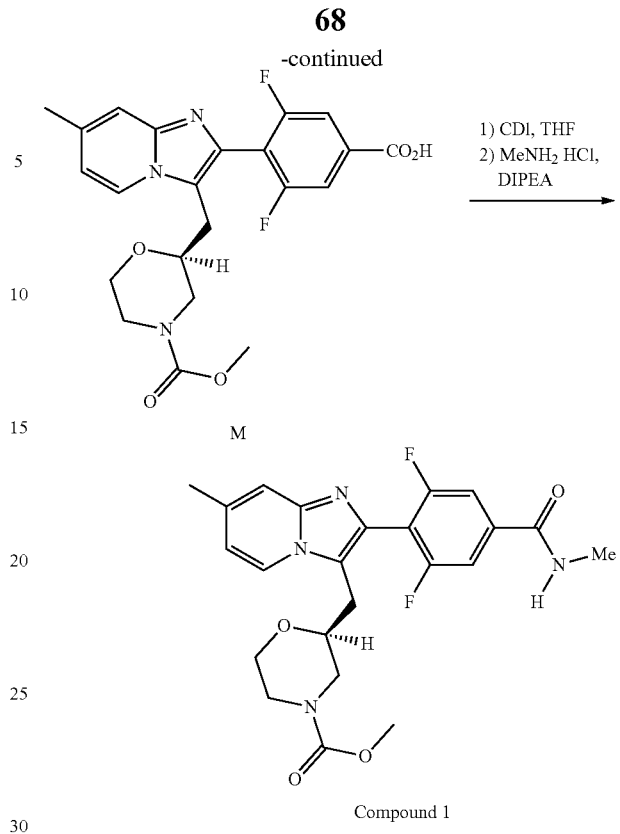

M

Compound 1

Ethyl acetate was charged into a reactor and degassed. Compound J (80 g) was added followed by CuBr$_2$ (101 g). The resulting mixture was stirred at 65° C. to 75° C. for 15 to 24 h and treated with additional CuBr$_2$ if HPLC shows the reaction was incomplete. The reaction was stirred an additional 3 h to 5 h at 65° C. to 75° C. for an additional 3 to 5 h, cooled to 20° C. to 30° C. and water was added followed by sodium bicarbonate. The resulting mixture was filtered through celite and the filter cake was washed with ethyl acetate. The organic later was washed with 5% EDTA disodium salt solution to remove copper residues and then washed with 1% sodium bicarbonate solution followed by water to afford compound K which was used directly ("as is") in the following step.

The ethyl acetate solution from above was exchanged with acetonitrile to generate a solution of K (100 g) in acetonitrile. 2-amino-4-methylpyridine (72.06 g) was charged to the solution which was then stirred under nitrogen at 75° C. to 85° C. for 30 h to 40 h. The mixture was concentrated below 40° C. to 1-2 volumes and diluted with dichloromethane. Water was added, the mixture was cooled to 0° C. to 10° C., and acidified with 2N HCl to pH 4-5. The layers were separated and the aqueous layer was extracted with additional dichloromethane. The combined organic layers were washed with water at 0° C. to 10° C., 7% sodium bicarbonate solution at 0° to 10°, and then water. The organic layer was treated with silica gel and the mixture was concentrated to dryness below 35° C. The residue was transferred to a silica pad which was eluted with dichloromethane-ethyl acetate (1V/9V) and the fractions containing compound L were concentrated and diluted with THF. This was repeated until the residual ethyl acetate was <1%.

The THF solution of L was cooled to 15° C. to 25° C. and treated with a 10% LiGH solution and the mixture was stirred for 2 h to 5 h. NaBH$_4$ (2.11 g) was then added to the mixture in portions at 15° C. to 25° C. and the reaction was stirred for 2 h to 4 h. Water was added dropwise at 0° C. to 10° C. and the mixture was diluted with MTBE. The layers were separated and the aqueous layer was washed with fresh MTBE. The aqueous layer was cooled to 0° C. to 10° C., treated with dichloromethane-methanol (~6-1) and the pH was adjusted to 4-5 using 2N HCl. The mixture was filtered through celite and the aqueous layer was extracted with fresh dichloromethane-methanol (6-1). The combined organic layers were concentrated below 35° C. to 1-2V and ethanol (2-3 V) was added. This solution was concentrated to 1-2 V, treated with ethyl acetate, and the resulting mixture was concentrated to 1-2 V. Additional ethanol-ethyl acetate was added and the mixture was heated to 70° C. to 85° C. for 10 to 30 minutes. The mixture was cooled and stirred at −15° C. to 5° C. for 2 to 8 h. The mixture was filtered to afford compound M which was washed with ethyl acetate. Compound M was slurried in ethyl acetate and stirred for 1 to 3 h at −15° C. to 5° C. The mixture was filtered and compound M was washed with additional ethyl acetate and dried.

A solution of M (26 g) in THF (115 mL) was stirred at 20° C. to 30° C. and 19 g of CDI (1,1-carbonyldiimidazole) was added. The mixture was stirred for 0.5 h to 1 h and then 7.9 g of methylamine hydrochloride was added in portions followed by dropwise addition of 18.9 g of diisopropylethylamine. The reaction was stirred at 20° C. to 30° C. for 2 to 34 h, and then diluted dropwise with water while maintaining the temperature. Dichloromethane (173 g) was added the mixture was stirred and the layers were separated. The aqueous layer was extracted with fresh dichloromethane and the combined organic layers were washed twice with 27% ammonium chloride solution and then twice with water. The organic layer containing compound 1 was cycled through activated carbon for 1 to 3 h using a CUNO filter. The filtrate was concentrated to 1-2 V below 35° C. and the dichloromethane was exchanged with ethyl acetate through successive addition/evaporation operations until the residual dichloromethane was <1%. Ethyl acetate (2-4 V) was added. A mixture of compound 1 in ethyl acetate was stirred at 45° C. to 55° C. for 1 to 2 h, cooled to 20° C. to 30° C. and then stirred for 1 to 2 h. Compound 1 was filtered and washed with ethyl acetate, and dried.

Recrystallization of Compound 1

Compound 1 was treated with water/methanol (1V/7V; 6.5-7.9 kg) and stirred at 47° C. to 55° C. under nitrogen for 0.5 to 3 h until a clear solution was obtained. The solution was polish filtered and the original reactor was rinsed with methanol/water. The mixture was warmed to 47° C. to 55° C. and stirred for 10 minutes to 30 minutes to obtain a clear solution. Water (8 kg) was added under nitrogen while maintaining the temperature and the mixture was seeded. The mixture was stirred at 47° C. to 55° C. under nitrogen for 3 h to 6 h and then cooled to 22° C. to 27° C. over 5 h. The mixture was stirred for 12 h to 24 h and filtered under nitrogen. Compound 1 was washed with water/methanol (2/1.8) and dried at 47° C. to 53° C.

Example 3: Alternative synthesis of methyl (S)-2-((2-(2,6-difluoro-4-(methylcarbamoyl)phenyl)-7-methylimidazo[1,2-a]pyridin-3-yl)methyl)morpholine-4-carboxylate (Compound 1)

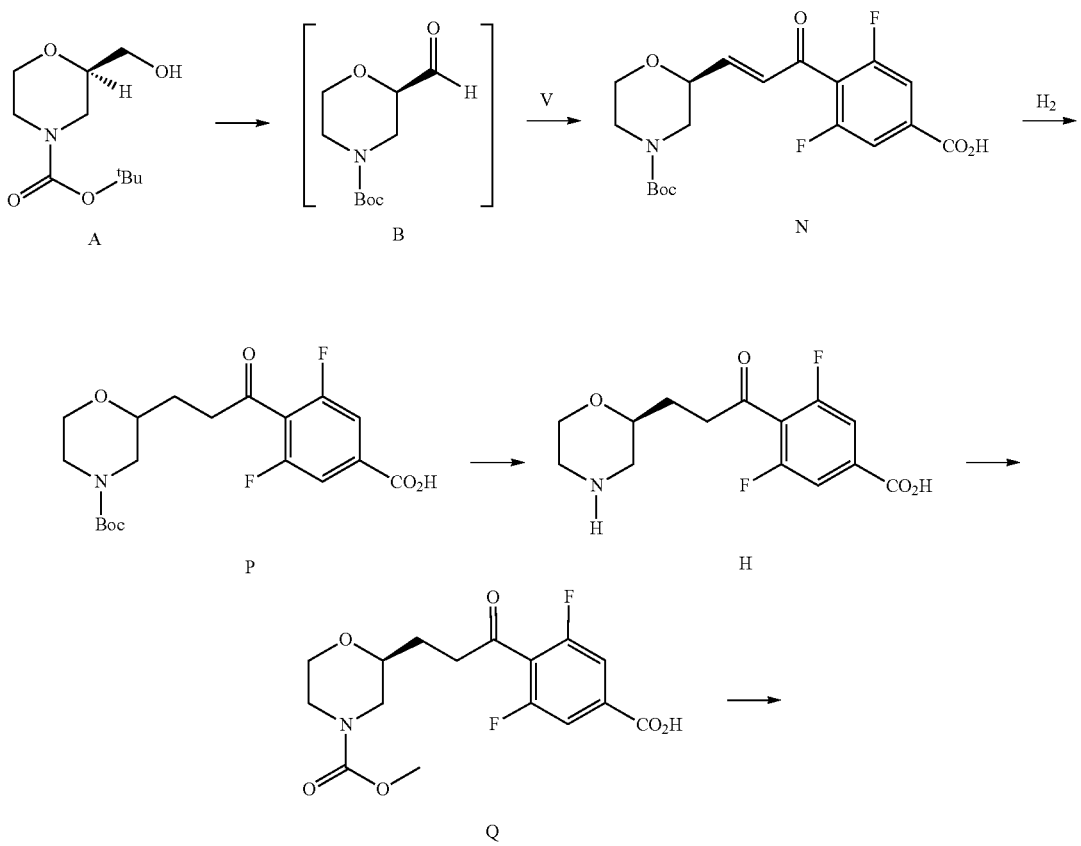

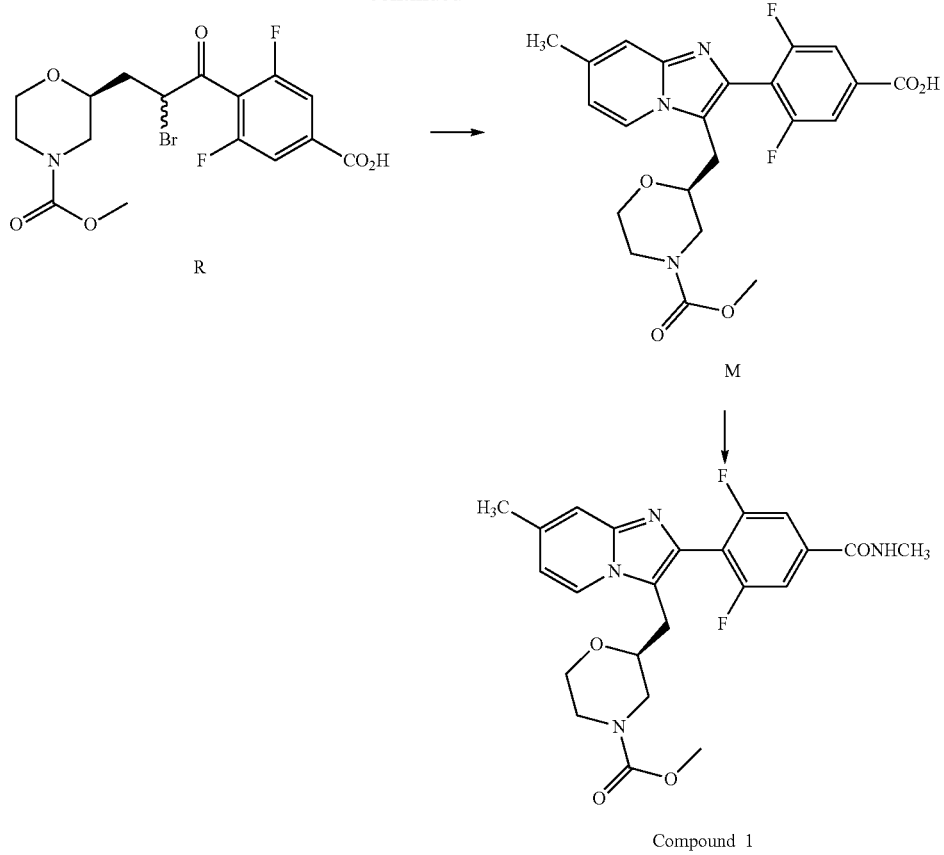

Compound 1

A solution of starting material A (30 g, 0.138 mole) in ethyl acetate (100 mL) was treated with DMSO (129 g, 1.66 mole, 117 mL; 12 equiv) while maintaining the temperature at <30° C. The mixture was cooled to −10° C. under nitrogen and a solution of propanephosphonic acid anhydride (T3P) (0.221 mole; 1.6 equiv) in ethyl acetate was added dropwise. The resulting mixture was stirred at −10° C. to 0° C. for 1 h and then treated dropwise with N,N-diisopropylethylamine (39.2 g, 0.304 mole; 2.2. equiv). The resulting mixture was stirred at −10° C. to 0° C. for 18 h.

A slurry of potassium bicarbonate (9 equivalent relative to compound A) in water (8 volumes) was cooled to −5° C. A reaction mixture containing aldehyde B was quenched into the bicarbonate solution while maintaining the temperature at −5° C. to 5° C. To this was added sequentially, intermediate V (48.7 g, 0.145 mole; 1.05 equiv), THE (6 V), and a solution of 2.5 equivalents of $K_2CO_3$ (47.7 g, 0.345 mole) in 3 volumes of water at −5° C. to 5° C. The reaction was stirred at −5° C. to 5° C. for 5 h and then stirred at 20° C. to 30° C. for 5 h. The reaction was cooled to −5° C. to 5° C. and a 20% aqueous solution of oxone (1 equivalent) was added while maintaining the temperature. The mixture was then stirred for 1 h while maintaining the temperature at −5° C. to 5° C. The pH was then adjusted to 3-5 using 85% $H_3PO_4$. The reaction was filtered and the filter cake was washed with fresh ethyl acetate (10 V). The layers were separated and the layers were separated and the aqueous phase was extracted with ethyl acetate (2×20 volumes). The organic layers were combined and washed with water (2×10 volumes). The organic solution was concentrated to afford compound N which was recrystallized from 2 volumes of acetonitrile by cooling at −15° C. to 5° C. to afford N (64% overall yield for the 2 steps from compound A).

A solution of recrystallized N (25 g) in THE (100 mL) was stirred under nitrogen. Wet Pd/C (1.25 g) was added and the resulting mixture was stirred at room temperature under 40-50 psi of $H_2$ for 18 h. The catalyst was filtered and washed with fresh THF. The filtrate was concentrated and the residual THE solvent was swapped several times with acetonitrile. A solution of the reduced product P in acetonitrile (75 mL) was cooled to −15° C. to −5° C. and stirred. The crystallized product was filtered and washed with −10 mL of acetonitrile to afford P (21.1 g) in 84% yield).

Compound P (130 g) in ethyl acetate was treated with 4M HCl in ethyl acetate (5 equivalents HCl). The reaction was stirred at 15° C. to 25° C. and monitored by HPLC to ensure completion (~2 hours). The solid was filtered, washed with ethyl acetate and dried at 50° C. for 10 h to afford compound H (108.2 g).

A solution of compound H (20 g, 0.06 mole) was charged to a flask followed by THE (100 mL) and water (30 mL). The mixture was cooled to −5° C. and sodium bicarbonate (22.5 g, 0.27 mole; 4.5 equiv) was added. A solution of Moc-Cl (6.77 g, 0.072 mole; 1.2 equiv) in THE (40 mL) was added to the mixture dropwise over 30 minutes while maintaining the temperature at −5° C. to 0° C. After the starting 6 was consumed, the resulting solid was filtered and washed with water (~40 mL) and then dried at 45° C. to 55° C. to afford the sodium salt of Q (29.55 g). The sodium salt was converted to the carboxylic acid by addition to water and adjusting the pH to 3 using 3M HCl. The resulting mixture was extracted with ethyl acetate and the organic extracts were concentrated. The product Q was recrystallized from ethyl acetate: methyl cyclohexane (1.5 V: 10 V).

A solution of compound Q (80 g based on starting sodium salt, 0.224 mole) in dichloromethane (400 mL) was prepared. N-bromosuccinimide (NBS; 39.6 g, 0.224 mole) was added at room temperature and the resulting mixture was cooled to −5° C. Triflic acid (1 equiv) was added dropwise and the resulting mixture was stirred at 25° C. to 30° C. Additional NBS (0.02 equiv) was added and the mixture was stirred an additional 1 h. The reaction was cooled to −5° C. and charged into a cold 7% aqueous solution of sodium bicarbonate. The resulting pH was 5-6. Ascorbic acid (0.01 equiv) was added, the layers were separated and the aqueous layer was extracted with dichloromethane (2×250 mL). The combined organic layers were washed with water and the resulting solution of compound R (assay yield 101% for 2 diastereomers) was used directly in the following step.

A solution of R in DCM was concentrated to a small volume and the DCM was exchanged for acetonitrile (total of 10 V of acetonitrile). 2-amino-4-methylpyridine (5 equivalents relative to R) was added and the reaction was stirred at 50° C. for 24 h and then at 80° C. for 16 h. The reaction mixture was concentrated to remove acetonitrile and a mixture of dichloromethane (8 volumes)-water (3 volumes) was added. The mixture was cooled to 0-10° C. and the pH was adjusted to 2.5 using 2N HCl. The aqueous layer was extracted with dichloromethane and the organic layer was concentrated and the solvent was exchanged for THF. 10% aqueous NaOH was added (1.5 equivalents of NaOH) followed by $NaBH_4$ (0.45 equivalents) and stirred at 200 for 2-5 h. Water was added (4 volumes) and the mixture washed with MTBE. Dichloromethane (5 volumes) was added to the aqueous layer containing the sodium salt of the product and the pH was adjusted to 5.6-5.8 using 2N HCl. The aqueous layer was extracted with dichloromethane, concentrated and the solvent was exchanged with ethanol and concentrated to ~0.4 volumes. Two volumes of ethyl acetate were added and the mixture was stirred at 0° C. and filtered to afford compound M. Compound M was recrystallized by heating in methanol (5 volumes) at 55-60° C. followed by the addition of seed crystals and then cooling to 0-5° C. over 1 hour. Water (10 volumes) was added dropwise at −5 to 5° C. and the mixture was stirred for 15 h, filtered and compound M was washed with 1:2 methanol-water and dried at 55-60° C. under vacuum.

Compound 1 from was prepared from compound M as described in Example 2.

Synthesis of Intermediate V

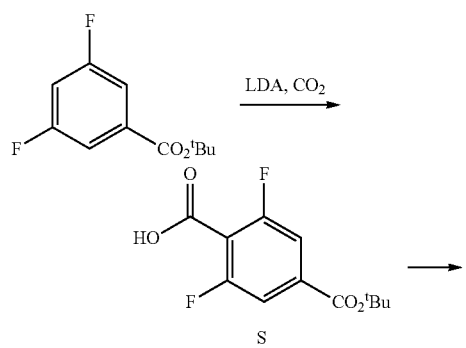

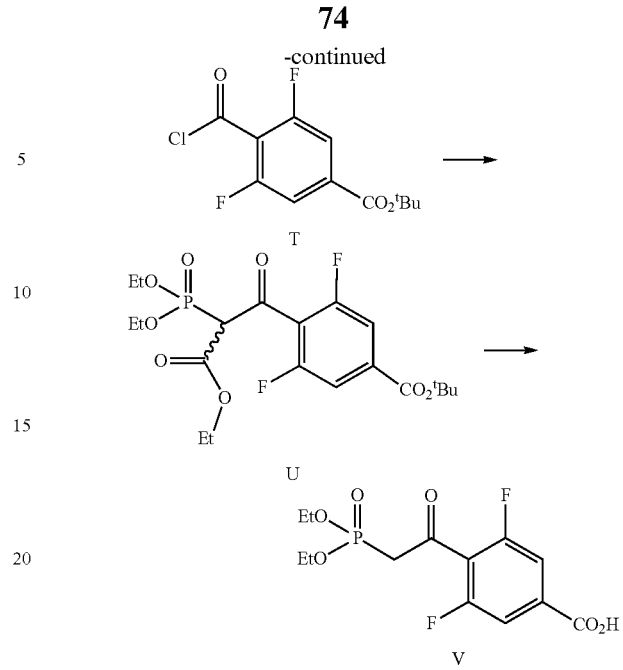

A solution of carboxylic acid S (100 g, 0.387 mole) in 2-methyltetrahydrofuran (400 mL) and DMF (1.61 g, 0.022 mole) was cooled to 10° C. to 20° C. The solution was then treated dropwise with oxalyl chloride (61.45 g, 0.48 mole) such that the temperature was maintained at 10° C. to 20° C. and the resulting mixture was stirred for 1-3 h at 10° C. to 20° C. The resulting solution of acid chloride T was used directly in the next step.

$MgCl_2$ (46.46 g, 0.488 mole) was charged to the flask containing T followed by 2-methyltetrahydrofuran (400 mL). Ethyl 2-diethoxyphosphoryacetate (101.06 g, 0.4686 mole) was then added to the flask. While maintaining a temperature of 10° C. to 25° C., triethylamine (196 g, 1.9365 mole) was added dropwise. The reaction was then stirred at 10° C. to 25° C. for 1-3 h. The temperature was then adjusted to 0° C. to 10° C. and water (250 mL) was added dropwise while maintaining the temperature at <10° C. The pH was then adjusted to 2.0-4.0 using ~275 g of 18% sulfuric acid (temperature maintained at <10° C.). An additional 250 mL of water was added and the organic layer was separated. The organic layer was washed using 7% sodium bicarbonate and then concentrated to 2-3 volumes while maintaining the temperature at <40° C. Toluene (170 mL) was added and the resulting solution was concentrated to 2-3 volumes while maintaining the temperature at <40° C. Acetic acid (944 mL) was added and the resulting solution containing U was used directly in the next step.

Trifluoroacetic acid (220.8 g, 1.937 mole) was added dropwise at <40° C. to the solution of U prepared in the previous step. The resulting mixture was stirred at 85° C. to 95° C. for 12-24 h. The mixture was then concentrated to 2-3 volumes at a temperature of <70°. While maintaining a temperature of 20° C. to 30° C., water (1.44 L) was added dropwise and the resulting mixture was stirred for 2-4 h. The product was filtered and washed with water (~140 mL). The product was treated with methyl tert-butyl ether (133 mL) and the resulting slurry was stirred at −20° C. to −5° C. for 1-2 h. The product was filtered and washed with a methyl tert-butyl ether and then dried at 50° C. to 60° C. to afford intermediate V (115 g).

Example 4: Potency and Selectivity for Human P2X3 and P2X2/3 Receptors

The ability of compound 1 described herein to act as an antagonist of the P2X3 and P2X2/P2X3 channel (encoded by the human P2RX2 and P2RX3 genes, stably expressed in HEK293 cells) was evaluated with a Fluo-8 calcium kit. Compound 1 was evaluated at twelve concentrations.

For the antagonist effect assessment, the cells were pre-incubated with Compound 1 for 20 minutes, then stimulated with the P2X3 and P2X2/P2X3 agonist α,β-methyleneATP (meATP) at final concentrations of 3 µM and 30 µM. Four minutes fifty seconds after addition of meATP, ionomycin was added at a final concentration of 5 µM in order to obtain the maximum calcium influx and fluorescence signal possible from the cells. Fluorescence was recorded continuously for 10 minutes, starting 10 seconds prior to the addition of meATP. $IC_{50}$s obtained using the above methods indicate that Compound 1 is a selective P2X3 antagonist (P2X3 $IC_{50}$=11 nM; P2X2/3 $IC_{50}$>30 µM).

The examples and embodiments described herein are for illustrative purposes only and in some embodiments, various modifications or changes are to be included within the purview of disclosure and scope of the appended claims.

What is claimed is:

1. A process for the preparation of methyl (S)-2-((2-(2,6-difluoro-4-(methylcarbamoyl)phenyl)-7-methylimidazo[1,2-a]pyridin-3-yl)methyl)morpholine-4-carboxylate (Compound 1):

(Compound 1)

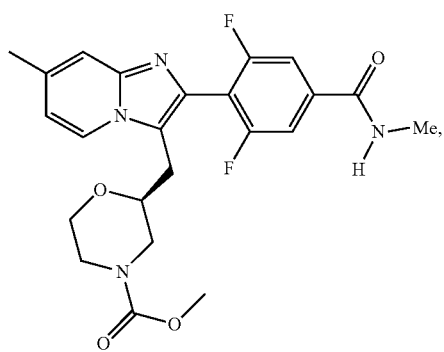

comprising contacting a compound with the structure:

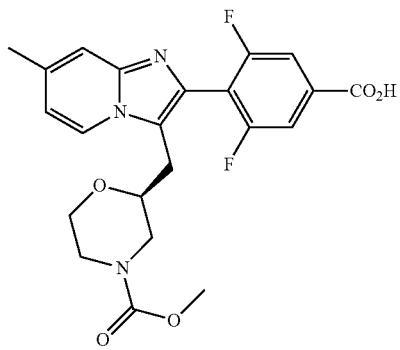 [SMILES: COC(=O)N1CCO[C@@H](Cc2c(-c3c(F)cc(C(=O)O)cc3F)nc3cc(C)ccn23)C1]

with an amide coupling reagent and methylamine or a salt of methylamine.

2. The process of claim 1, wherein the amide coupling reagent is carbonyldiimidazole.

3. The process of claim 1, wherein the amide coupling reagent is propanephosphonic acid anhydride (T3P).

4. The process of claim 1, wherein the compound with the structure:

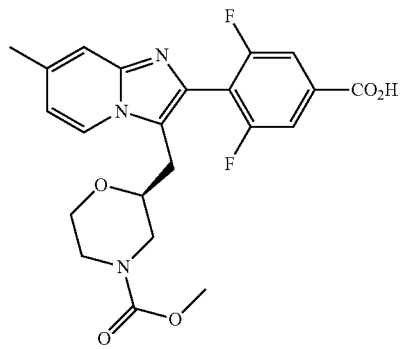 [SMILES: COC(=O)N1CCO[C@@H](Cc2c(-c3c(F)cc(C(=O)O)cc3F)nc3cc(C)ccn23)C1]

is prepared by a process comprising contacting a compound with the structure:

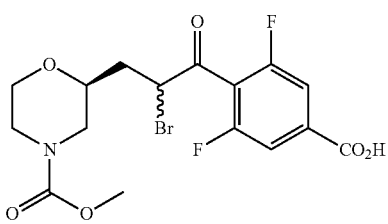 [SMILES: COC(=O)N1CCO[C@@H](CC(Br)C(=O)c2c(F)cc(C(=O)O)cc2F)C1]

with 2-amino-4-methylpyridine and optionally sodium borohydride.

5. The process of claim 1, wherein the compound with the structure:

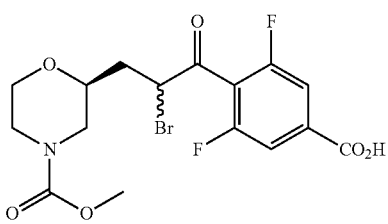 [SMILES: COC(=O)N1CCO[C@@H](CC(Br)C(=O)c2c(F)cc(C(=O)O)cc2F)C1]

is prepared by a process comprising contacting a compound with the structure:

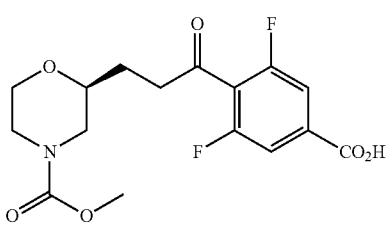 [SMILES: COC(=O)N1CCO[C@@H](CCC(=O)c2c(F)cc(C(=O)O)cc2F)C1]

with a brominating reagent.

6. The process of claim 5, wherein the brominating agent is N-bromosuccinimide in the presence of acid.

7. The process of claim 5, wherein the compound with the structure:

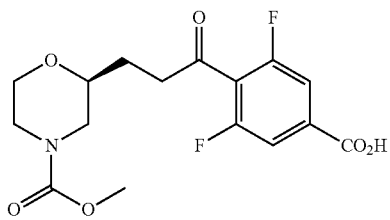 [SMILES: COC(=O)N1CCO[C@@H](CCC(=O)c2c(F)cc(C(=O)O)cc2F)C1]

is prepared by a process comprising contacting a compound with the structure:

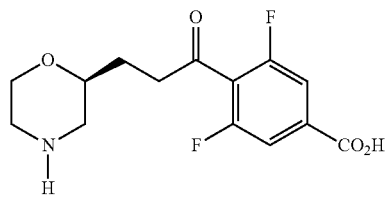 [SMILES: O=C(O)c1cc(F)c(C(=O)CC[C@H]2CNCCO2)c(F)c1]

with methyl chloroformate and a base.

8. The process of claim 7, wherein the base is sodium bicarbonate.

9. The process of claim 7, wherein the compound with the structure:

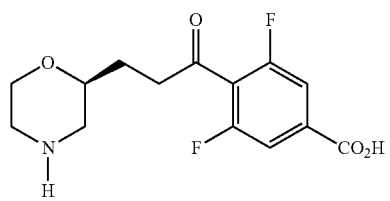 [SMILES: O=C(O)c1cc(F)c(C(=O)CC[C@H]2CNCCO2)c(F)c1]

is prepared by a process comprising contacting a compound with the structure:

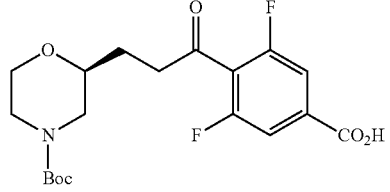 [SMILES: CC(C)(C)OC(=O)N1CCO[C@@H](CCC(=O)c2c(F)cc(C(=O)O)cc2F)C1]

with hydrogen chloride in the presence of a solvent.

10. The process of claim 9, wherein the solvent is ethyl acetate.

11. The process of claim 9, wherein the compound with the structure:

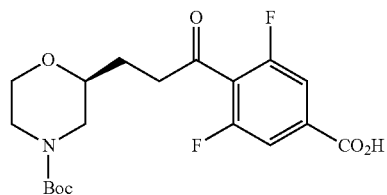 [SMILES: CC(C)(C)OC(=O)N1CCO[C@@H](CCC(=O)c2c(F)cc(C(=O)O)cc2F)C1]

is prepared by a process comprising contacting a compound with the structure:

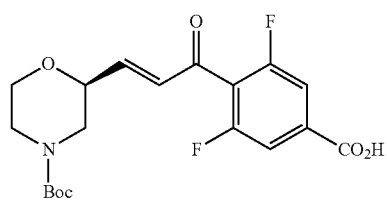 [SMILES: CC(C)(C)OC(=O)N1CCO[C@@H](/C=C/C(=O)c2c(F)cc(C(=O)O)cc2F)C1]

with a hydrogenation catalyst and hydrogen.

12. The process of claim 11, wherein the hydrogenation catalyst is palladium on carbon, palladium hydroxide, rhodium on carbon, rhodium on alumina, platinum oxide, or platinum on carbon.

13. The process of claim 12, wherein the hydrogenation catalyst is palladium on carbon.

14. The process of claim 11, wherein the compound with the structure:

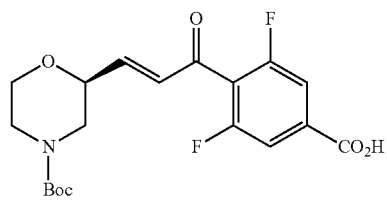 [SMILES: CC(C)(C)OC(=O)N1CCO[C@@H](/C=C/C(=O)c2c(F)cc(C(=O)O)cc2F)C1]

is prepared by a process comprising contacting a compound with the structure:

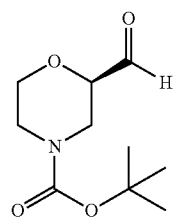

with a compound with the structure:

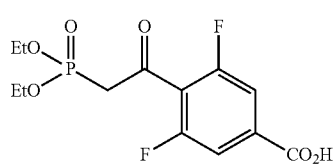 [SMILES: CCOP(=O)(CC(=O)c1c(F)cc(C(=O)O)cc1F)OCC]

with a base.

15. The process of claim 14, wherein the base is a mixture of potassium bicarbonate and potassium carbonate.

16. The process of claim 14, wherein the compound with the structure:

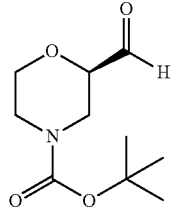

is prepared by a process comprising contacting a compound with the structure:

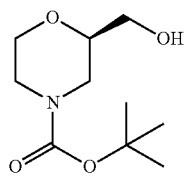

with 2,2,6,6-tetramethylpiperidine 1-oxyl or T3P.

17. A process for the preparation of methyl (S)-2-((2-(2,6-difluoro-4-(methylcarbamoyl)phenyl)-7-methylimidazo[1,2-a]pyridin-3-yl)methyl)morpholine-4-carboxylate (Compound 1), comprising:

A) the reaction of a compound with the structure:

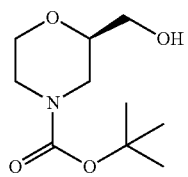

with 2,2,6,6-tetramethylpiperidine 1-oxyl or T3P to produce a compound with the structure:

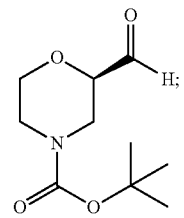

B) followed by the reaction of the compounds with the structures:

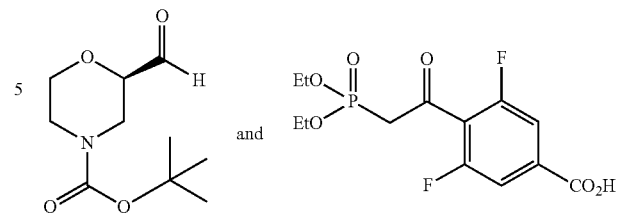

with potassium carbonate and potassium bicarbonate to produce a compound with the structure:

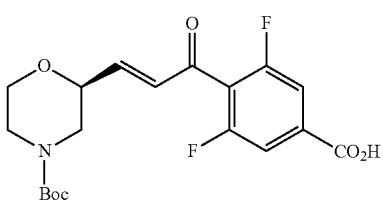 [SMILES: CC(C)(C)OC(=O)N1CCO[C@@H](/C=C/C(=O)c2c(F)cc(C(=O)O)cc2F)C1]

C) followed by the reaction of the compound with the structure:

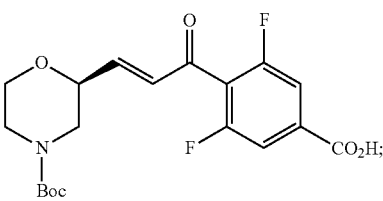 [SMILES: CC(C)(C)OC(=O)N1CCO[C@@H](/C=C/C(=O)c2c(F)cc(C(=O)O)cc2F)C1]

with palladium on carbon and hydrogen to produce a compound with the structure:

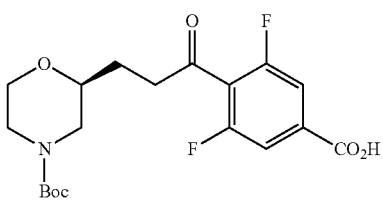 [SMILES: CC(C)(C)OC(=O)N1CCO[C@@H](CCC(=O)c2c(F)cc(C(=O)O)cc2F)C1]

D) followed by the reaction of the compound with the structure:

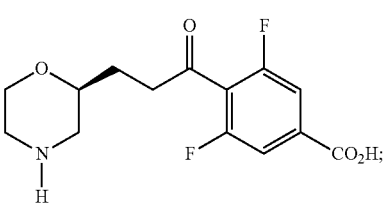 [SMILES: O=C(O)c1cc(F)c(C(=O)CC[C@H]2CNCCO2)c(F)c1]

with hydrogen chloride in ethyl acetate to produce a compound with the structure;

81

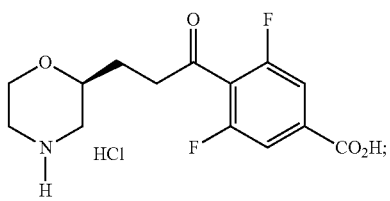 [SMILES: O=C(O)c1cc(F)c(C(=O)CC[C@H]2CNCCO2)c(F)c1 ; Cl]

E) followed by the reaction of the compound with the structure:

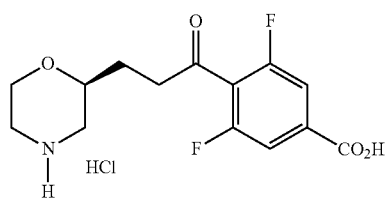 [SMILES: O=C(O)c1cc(F)c(C(=O)CC[C@H]2CNCCO2)c(F)c1 ; Cl]

with methyl chloroformate and sodium bicarbonate to produce a compound with the structure:

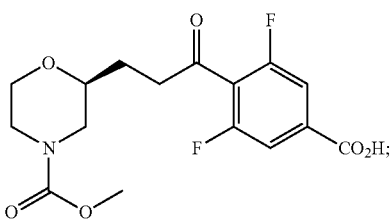 [SMILES: COC(=O)N1CCO[C@@H](CCC(=O)c2c(F)cc(C(=O)O)cc2F)C1]

F) followed by the reaction of the compound with the structure:

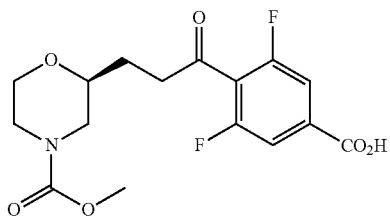 [SMILES: COC(=O)N1CCO[C@@H](CCC(=O)c2c(F)cc(C(=O)O)cc2F)C1]

with N-bromosuccinimide and acid to produce a compound with the structure:

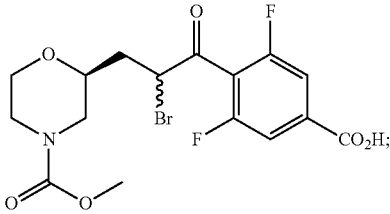 [SMILES: COC(=O)N1CCO[C@@H](CC(Br)C(=O)c2c(F)cc(C(=O)O)cc2F)C1]

G) followed by the reaction of the compound with the structure:

82 with 2-amino-4-methylpyridine and optionally sodium borohydride to produce a compound with the structure:

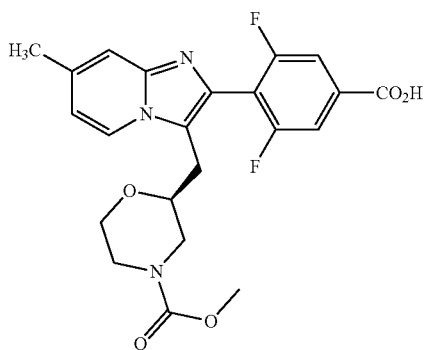 [SMILES: COC(=O)N1CCO[C@@H](Cc2c(-c3c(F)cc(C(=O)O)cc3F)nc3cc(C)ccn23)C1]

H) followed by the reaction of the compound with the structure:

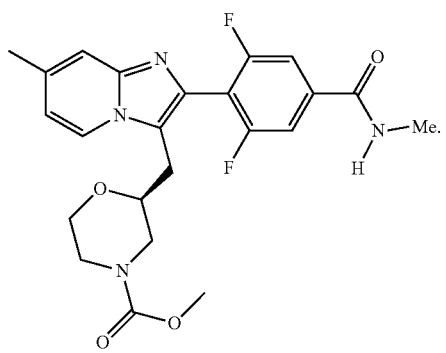 [SMILES: CNC(=O)c1cc(F)c(-c2nc3cc(C)ccn3c2C[C@H]2CN(C(=O)OC)CCO2)c(F)c1]

with carbonyldiimidazole and methylamine to produce a compound with the structure:

* * * * *